US011388441B2

(12) United States Patent
Hendry et al.

(10) Patent No.: US 11,388,441 B2
(45) Date of Patent: Jul. 12, 2022

(54) DERIVATION OF SPS TEMPORAL ID NESTING INFORMATION FOR MULTI-LAYER BITSTREAMS

(71) Applicant: QUALCOMM Incorporated, San Diego, CA (US)

(72) Inventors: Fnu Hendry, Poway, CA (US); Adarsh Krishnan Ramasubramonian, San Diego, CA (US); Ye-Kui Wang, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 14/657,617

(22) Filed: Mar. 13, 2015

(65) Prior Publication Data

US 2015/0271526 A1 Sep. 24, 2015

Related U.S. Application Data

(60) Provisional application No. 61/955,158, filed on Mar. 18, 2014.

(51) Int. Cl.
*H04N 19/70* (2014.01)
*H04N 19/30* (2014.01)
(Continued)

(52) U.S. Cl.
CPC ........... *H04N 19/70* (2014.11); *H04N 19/124* (2014.11); *H04N 19/172* (2014.11);
(Continued)

(58) Field of Classification Search
CPC .... H04N 19/70; H04N 19/124; H04N 19/172; H04N 19/187; H04N 19/188; H04N 19/30; H04N 19/31; H04N 19/46; H04N 19/60
(Continued)

(56) References Cited

U.S. PATENT DOCUMENTS 9,516,379 B2 12/2016 Chen et al.
9,794,595 B2 10/2017 Hendry et al.
(Continued)

FOREIGN PATENT DOCUMENTS

WO WO-2012122169 9/2012
WO 2014007590 A1 1/2014
(Continued)

OTHER PUBLICATIONS

Chen J. et al., "SHVC Working Draft 1", 12. JCT-VC Meeting; 103. MPEG Meeting; Jan. 14, 2013-Jan. 23, 2013; Geneva; (Joint Collaborative Team On Video Coding of ISO/IEC JTC1/SC29/WG11 and ITU-T SG.16); URL: http://wftp3.itu.int/av-arch/jctvc-site/, No. JCTVC-L1008, Mar. 20, 2013 (Mar. 20, 2013), XP030113953, pp. 1-33.
(Continued)

*Primary Examiner* — Jae N Noh
(74) *Attorney, Agent, or Firm* — Campbell C. Chiang; Shumaker & Sieffert, P.A.

(57) ABSTRACT

According to certain aspects, an apparatus for coding video information includes a memory and a processor configured to determine whether a first syntax element is present in a bitstream, the first syntax element associated with a sequence parameter set (SPS) and a first flag indicative of whether a temporal identifier (ID) of a reference picture for pictures that refer to the SPS can be nested; and in response to determining that the first syntax element is not present in the bitstream: obtain a second syntax element indicative of a maximum number of temporal sub-layers in a particular layer of the plurality of layers; and determine whether to set the first flag equal to a second flag indicative of whether a temporal ID of a reference picture for any pictures can be nested based at least in part on a value of the second syntax element.

28 Claims, 10 Drawing Sheets

(51) Int. Cl.

| | | |
|---|---|---|
| H04N 19/124 | (2014.01) | |
| H04N 19/187 | (2014.01) | |
| H04N 19/46 | (2014.01) | |
| H04N 19/60 | (2014.01) | |
| H04N 19/172 | (2014.01) | |
| H04N 19/31 | (2014.01) | |
| H04N 19/169 | (2014.01) | |

(52) U.S. Cl.
CPC ......... *H04N 19/187* (2014.11); *H04N 19/188* (2014.11); *H04N 19/30* (2014.11); *H04N 19/31* (2014.11); *H04N 19/46* (2014.11); *H04N 19/60* (2014.11)

(58) Field of Classification Search
USPC .................................................. 375/240.26
See application file for complete search history.

(56) References Cited

U.S. PATENT DOCUMENTS

| | | | |
|---|---|---|---|
| 2009/0161762 A1 | 6/2009 | Jun et al. | |
| 2013/0343463 A1* | 12/2013 | Terada | H04N 19/463 375/240.18 |
| 2014/0003492 A1 | 1/2014 | Chen et al. | |
| 2014/0301437 A1 | 10/2014 | Wang | |
| 2014/0301439 A1 | 10/2014 | Chen et al. | |
| 2015/0195554 A1 | 7/2015 | Misra et al. | |
| 2015/0271507 A1* | 9/2015 | Hendry | H04N 19/70 375/240.25 |
| 2016/0255350 A1* | 9/2016 | Kang | H04N 19/436 |

FOREIGN PATENT DOCUMENTS

| | | |
|---|---|---|
| WO | WO-2014008170 A1 | 1/2014 |
| WO | WO-2014008287 A1 | 1/2014 |
| WO | WO-2014008290 A1 | 1/2014 |
| WO | 2015056941 A1 | 4/2015 |

OTHER PUBLICATIONS

Cho Y., et al., "MV-HEVC/SHVC HLS: Comments on general decoding process and selection of CPB operation in the HRD operation", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-H0023, Mar. 17, 2014 (Mar. 17, 2014), 4 pages; XP030132072.
Hannuksela M M: "MV-HEVC/SHVC HLS: On cross-layer impacts of IRAP and EOS", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0071-v3, Jul. 6, 2014 (Jul. 6, 2014), 8 pages; XP030116316.
Hendry, et al., "MV-HEVC/SHVC HLS: Miscellaneous HLS topics", 17. JCT-VC Meeting; Mar. 27, 2014-Apr. 4, 2014; Valencia; (Joint Collaborative Team on Video Coding of ISO/IEC JTC1/SC29/WG11 and ITU TSG.16); URL: http://wftp3.itu.int/av-arch/jctvc-site/,, No. JCTVC-Q0177, Mar. 19, 2014 (Mar. 19, 2014), 5 pages; XP030116126.
International Search Report and Written Opinion—PCT/US2015/020691—ISA/EPO—Jun. 17, 2015.
Ramasubramonian A K., et al., "MV-HEVC/SHVC HLS: Clarifications to the specification of end of sequence (EOS) NAL unit", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av arch/jctvc-site/,, No. JCTVC-R0224, Jun. 21, 2014 (Jun. 21, 2014), 4 pages; XP030116524.
Rodriguez A: "Introduction of temporal id type", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0330, Oct. 9, 2012 (Oct. 9, 2012), 6 pages; XP030113212.
Sato K: "On VPS", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0173, Oct. 1, 2012 (Oct. 1, 2012), 6 pages; XP030113055.
Sato K: "Syntax Issues", 10. JCT-VC Meeting; 101. MPEG Meeting; Nov. 7, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0183, Jul. 2, 2012 (Jul. 2, 2012), 13 pages; XP030112545.
Tech G., et al., "MV-HEVC Draft Text 7", 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-G1004-v8, Mar. 17, 2014 (Mar. 17, 2014), 130 Pages, XP030132042.
Tech G., et al., "MV-HEVC Draft Text 8", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-H1002, Apr. 8, 2014 (Apr. 8, 2014), 132 pages; XP030132291.
Thang T C., et al., "MV-HEVC/SHVC HLS: Improvements of Video and Picture Parameter Sets", 7. JCT-3V Meeting; Nov. 1, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/, No. JCT3V-G0136, Jan. 3, 2014 (Jan. 3, 2014), 4 pages; XP030131914.
Wang Y.K., et al., "AHG9: On cross-layer alignments in HEVC 3DV and scalable extensions," 13. JCT-VC Meeting; 104. MPEG Meeting; Apr. 18, 2013-Apr. 26, 2013; Incheon; (Joint collaborative team on video coding of ISO/IEC JTC1/SC29/WG11 and ITU-T SG.16); Retrieved from the Internet and URL: http://wftp3.itu.int/av-arch/jctvc-site/, No. JCTVC-M0266, Apr. 9, 2013 (Apr. 9, 2013), 6 pages, XP030114223.
Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages.
Bross B., et al., "High Efficiency Video Coding (HEVC) Text Specification Draft 7," JCTVC-I1003 d2, 9. JCT-VC Meeting; 100. Mpeg Meeting; Apr. 27, 2012-Jul. 5, 2012; Geneva; (Joint Collaborative Team on Video Coding of ISO/IECJTC1/SC29/WG 11 and ITU-T SG.16); URL: Http://wftp3.1tu.int/av-arch/JCTVC-site/, No. JCTVC-I1003, May 10, 2012 (May 10, 2012), XP030112373, 290 pages.
Bross B., et al., "WD5: Working Draft 5 of High-Efficiency Video Coding," JCTVC-G1103 d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen J., et al., "High Efficiency Video Coding (HEVC) Scalable Extensions Draft 5", 16, JCT-VC Meeting, Sep. 1, 2014-Jan. 17, 2014, San Jose, (Joint Collaborative Team on Video Coding of ISO/IEC JTC1/SC29/WG11 and ITU-T SG.16), Jan. 22, 2014 (Jan. 22, 2014), No. JCTVC-P1008-v4, XP030115882, 125 pages, URL: http://wftp3.itu.int/av-arch/ctvc-site/.
ITU-T H.265, Series H: Audiovisual and Multimedia Systems, Infrastructure of Audiovisual Services—Coding of Moving Video, Advanced Video Coding for Generic Audiovisual Services, The International Telecommunication Union, Octobei 2014, 540 pp.
Okubo S et al., "H.265/HEVC Textbook", First edition, Oct. 21, 2013, p. 209.
Response to Second Written Opinion from International Application No. PCT/US2015/020691, dated May 9, 2016, 12pp., 12 pp.
Response to Written Opinion from International Application No. PCT/US2015/020691, dated Jan. 14, 2016, 16pp., 16 pp.

(56) References Cited

OTHER PUBLICATIONS

Rodriguez A.A., "Single Layer: Conformance and Temporal id Semantics", Joint Collaborative Team on Video Coding (JCT-VC) of ITU-T SG 16 WP 3 and ISO/IEC JTC 1/SC 29/WG 11, 11th Meeting: Shanghai, CN, Oct. 2012, JCTVC-K0330_r7, pp. 1-6.
Sato K., "AHG9: On VPS", Joint Collaborative Team on Video Coding (JCT-VC) of ITU-T SG 16 WP 3 and ISO/IEC JTC 1/SC 29/WG 11, 11th Meeting: Shanghai, CN, Oct. 2012, JCTVC-K0173r1, pp. 1-6.
Sato K., "Syntax Issues", Joint Collaborative Team on Video Coding (JCT-VC) of ITU-T SG 16 WP 3 and ISO/IEC JTC 1/SC 29/WG 11, 10th Meeting: Stockholm, SE, Jul. 2012, JCTVC-J0183r4, pp. 1-14.
Wnang Y-K., et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11, Oct. 23-Nov. 1, 2013, Geneva, URL Http://wftp3.itu.int/av-arch/JCTVC-site/ , Document: CTVC-O1003_v1, Nov. 19, 2013, http://phenix.it-sudparis.eu/jct/doc_end_user/documents/15_Geneva/wg11/JCTVC01003-v1.zip, Nov. 19, 2013 (Nov. 19, 2013), XP030115457, 311 pages.
Written Opinion from International Application No. PCT/US2015/020691, dated Mar. 11, 2016, 12 pp.

\* cited by examiner

DERIVATION OF SPS TEMPORAL ID NESTING INFORMATION FOR MULTI-LAYER BITSTREAMS

INCORPORATION BY REFERENCE TO ANY PRIORITY APPLICATIONS

This application claims the benefit of U.S. Provisional Application No. 61/955,158, filed Mar. 18, 2014, which is incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, including both single-layer video coding and multi-layer video coding. Multi-layer video coding can include scalable video coding, multiview video coding, three-dimensional (3D) video coding, etc.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

An apparatus for coding video information according to certain aspects includes a memory and a processor. The memory is configured to store video information associated with a plurality of layers. The processor is configured to determine whether a first syntax element is present in a bitstream, the first syntax element associated with a sequence parameter set (SPS) and a first flag indicative of whether a temporal identifier (ID) of a reference picture for pictures that refer to the SPS can be nested. The processor is further configured to, in response to determining that the first syntax element is not present in the bitstream: obtain a second syntax element indicative of a maximum number of temporal sub-layers in a particular layer of the plurality of layers; and determine whether to set a value of the first flag equal to a value of a second flag, the second flag indicative of whether a temporal ID of a reference picture for any pictures can be nested based at least in part on a value of the second syntax element.

An apparatus for coding video information according to certain aspects includes a memory and a processor. The memory is configured to store video information associated with one or more layers. The processor is configured to code a current access unit (AU) in a bitstream including a plurality of layers, the plurality of layers including a reference layer and at least one corresponding enhancement layer. The processor is further configured to code a first end of sequence (EOS) network abstraction layer (NAL) unit associated with the reference layer in the current AU, the first EOS NAL unit having the same layer identifier (ID) as the reference layer. The processor is also configured to code a second EOS NAL unit associated with the enhancement layer in the current AU, the second EOS NAL unit having the same layer ID as the enhancement layer.

The systems, methods and devices of this disclosure each have several innovative aspects, no single one of which is solely responsible for the desirable attributes disclosed herein. The details of one or more examples are set forth in the accompanying drawings and the description below, which are not intended to limit the full scope of the inventive concepts described herein. Other features, objects, and advantages will be apparent from the description and drawings, and from the claims.

DETAILED DESCRIPTION

Figure 1A:
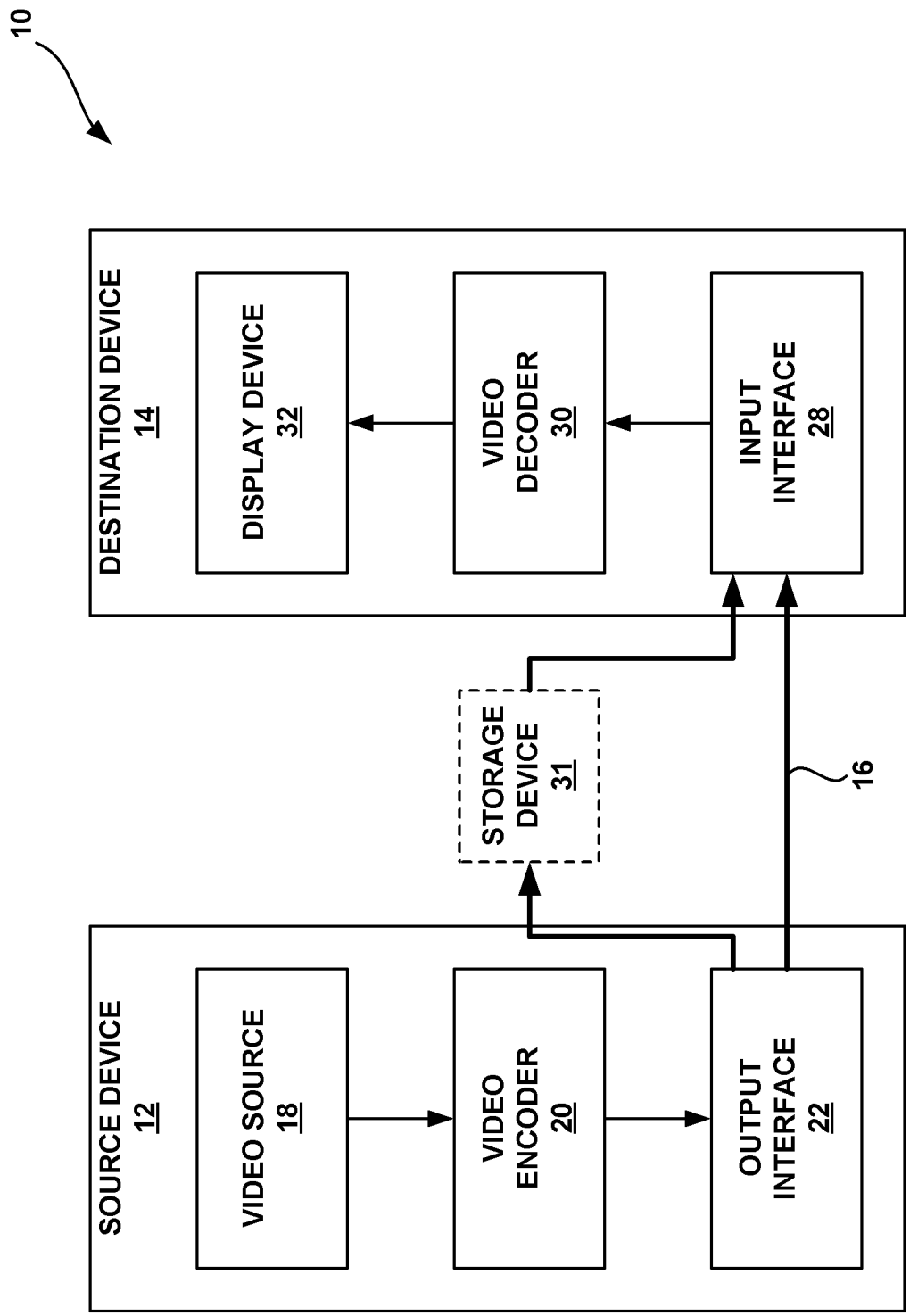
FIG. 1A is a block diagram illustrating an example video encoding and decoding system that may utilize techniques in accordance with aspects described in this disclosure.

In general, this disclosure relates to single layer coding as well as inter-layer prediction for scalable video coding in the context of advanced video codecs, such as HEVC (High Efficiency Video Coding). More specifically, the present disclosure relates to systems and methods for improved performance of inter-layer prediction in scalable video coding extension of HEVC, which may be referred to as SHVC.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization (ISO) and the International Electrotechnical Commission (IEC) (ISO/IEC) Moving Picture Experts Group (MPEG) 1 (MPEG-1) Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblock) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Overview

In a multi-layer bitstream, a layer can include one or more temporal sub-layers, and each temporal sub-layer can have an identifier (ID) associated with it called temporal ID. In general, pictures that have a higher temporal ID than the current picture are not used as reference pictures for the current picture. The flag sps_temporal_id_nesting_flag can further indicate whether a particular picture that has a temporal ID equal to or lower than the temporal ID of the current picture can be used as a reference picture when there exists another picture that has a lower temporal ID than the particular picture and that follows the particular picture in decoding order but precedes the current picture in decoding order.

The early versions of SHVC and MV-HEVC (e.g., Working Draft 5 of SHVC and Working Draft 7 of MV-HEVC) pose a conflict in the derivation of sps_temporal_id_nesting_flag when the syntax element is not present in the bitstream. Under certain conditions, the value of the flag cannot be determined to be either 0 or 1. In order to address these and other challenges, the techniques according to certain aspects can define how to derive the value of sps_temporal_id_nesting_flag under such conditions (e.g., set precedence in the derivation process) in order to eliminate the conflict.

In addition, in HEVC, one AU contains a picture from only one layer, and often the concept of picture and AU can be used interchangeably. In contrast, in SHVC and MV-HEVC, one AU may contain pictures from more than one layer, which can make it uncertain whether a variable or a flag should be associated with a particular layer (e.g., the base layer) or should apply to the whole AU. One example of such a variable is HandleCraAsBlaFlag. The variable HandleCraAsBlaFlag can indicate whether to handle a CRA picture as a BLA picture. The early versions of SHVC and MV-HEVC make it unclear whether HandleCraAsBlaFlag is associated with only the base layer or the AU. In order to address these and other challenges, the techniques according to certain aspects can also define whether HandleCraAsBlaFlag should be associated with only the base layer or the AU.

Moreover, as explained above with respect to HandleCraAsBlaFlag, because one AU can have pictures from more than one layer in SHVC and MV-HEVC, it may be uncertain whether an EOS NAL unit should be associated with a particular layer (e.g., the base layer) or should apply to the whole AU. The EOS NAL unit can indicate the end of a coded video sequence (CVS) and is generally followed by an IRAP picture, such as an IDR picture, a BLA picture, or a CRA picture. The early versions of SHVC and MV-HEVC do not make it clear whether the EOS NAL unit is associated with only the base layer or the AU. In order to address these and other challenges, the techniques according to certain aspects can define whether the EOS NAL unit should be associated with only the base layer or the AU.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
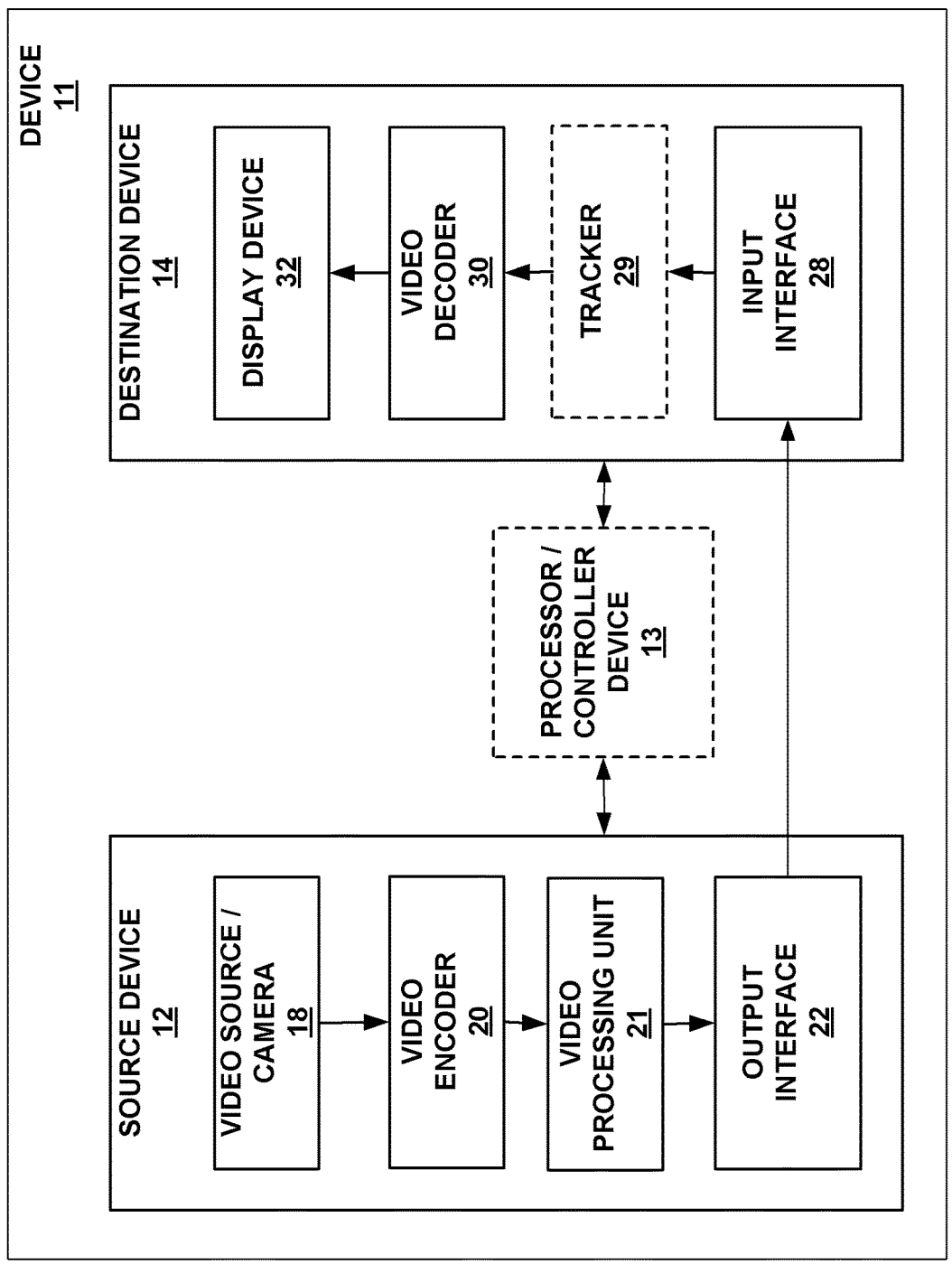
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones," as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes an input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional controller/processor device 13 in operative communication with the source and destination devices 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller device 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

The video encoder 20 and the video decoder 30 may operate according to a video compression standard, such as the HEVC, and may conform to a HEVC Test Model (HM). Alternatively, the video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
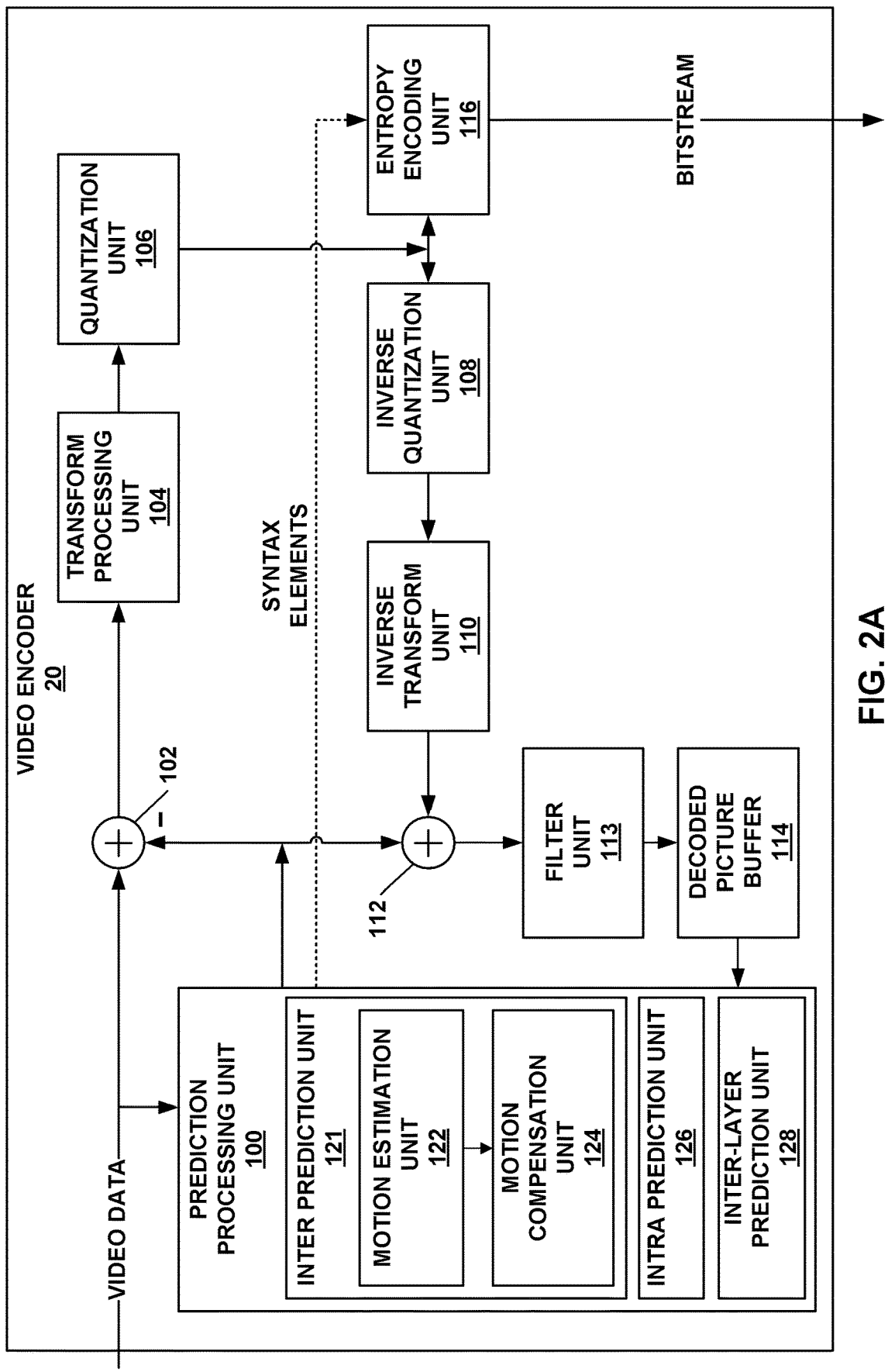
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure, including but not limited to the methods of inferring NoOutputOfPriorPicsFlag and related processes described in greater detail above and below with respect to FIGS. 4 and 5. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As further discussed below with reference to FIGS. 5 and 6, the prediction processing unit 100 may be configured to code (e.g., encode or decode) the PU (or any other reference layer and/or enhancement layer blocks or video units) by performing the methods illustrated in FIGS. 5 and 6. For example, inter prediction unit 121 (e.g., via motion estimation unit 122 and/or motion compensation unit 124), intra prediction unit 126, or inter-layer prediction unit 128 may be configured to perform the methods illustrated in FIGS. 5 and 6, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
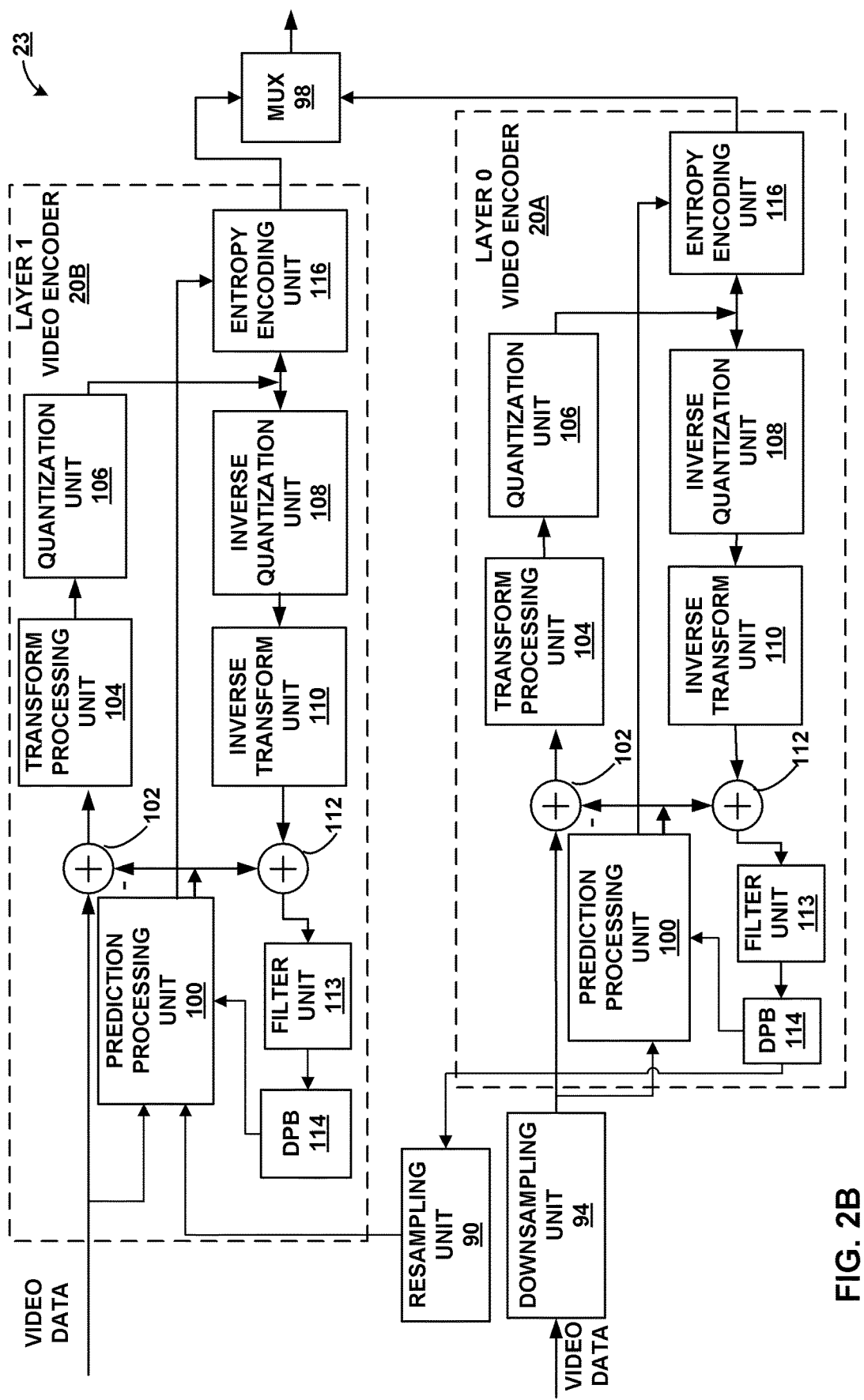
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
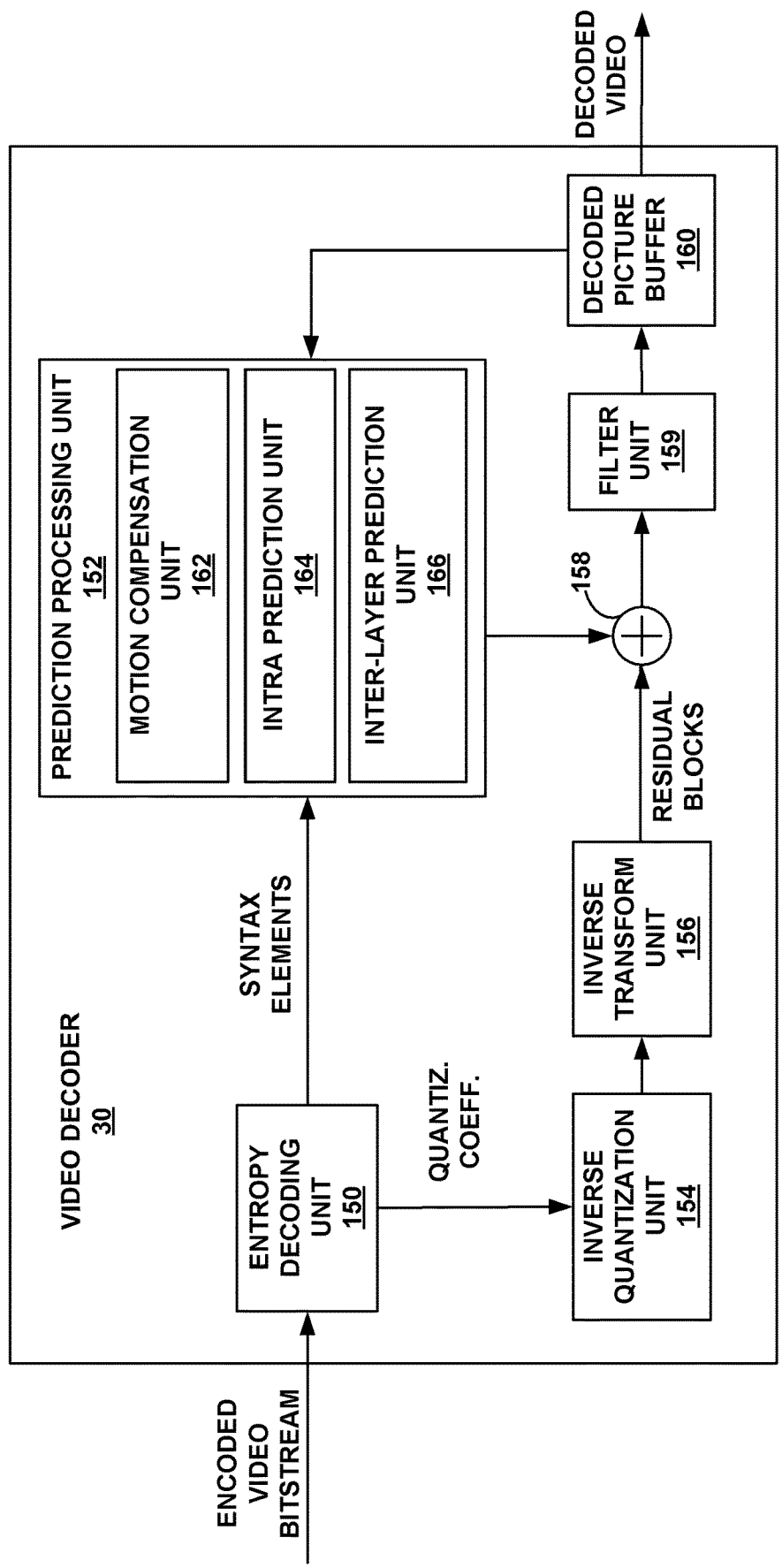
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure, including but not limited to the methods of inferring NoOutputOfPriorPicsFlag and related processes described in greater detail above and below with respect to FIGS. 4 and 5. As one example, motion compensation unit 162 and/or intra prediction unit 164 may be configured to perform any or all of the techniques described in this disclosure. In one embodiment, the video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to the video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

As further discussed below with reference to FIGS. 5 and 6, the prediction processing unit 152 may code (e.g., encode or decode) the PU (or any other reference layer and/or enhancement layer blocks or video units) by performing the methods illustrated in FIGS. 5 and 6. For example, motion compensation unit 162, intra prediction unit 164, or inter-layer prediction unit 166 may be configured to perform the methods illustrated in FIGS. 5 and 6, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
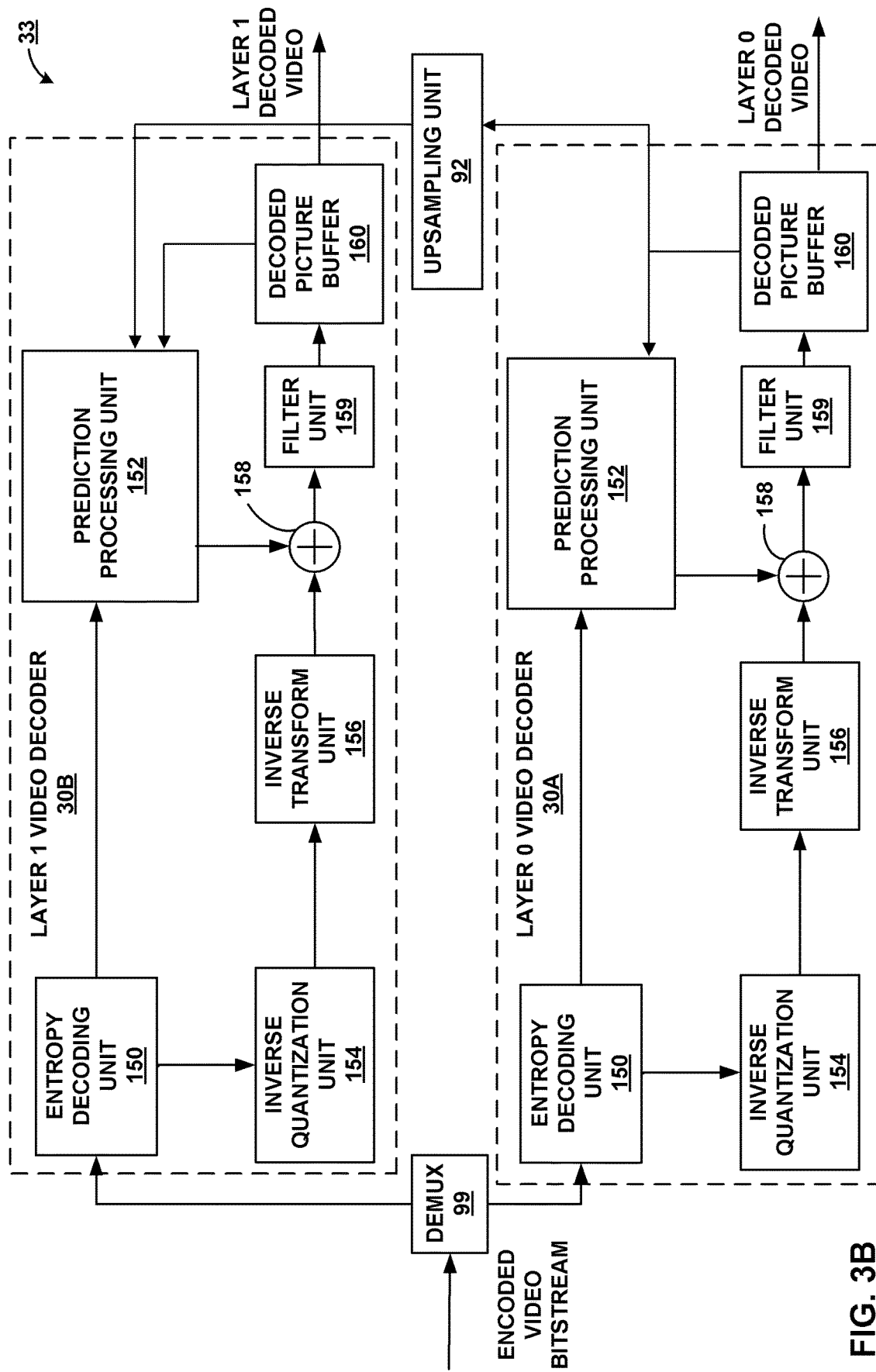
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame.

The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination module 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as IRAP pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures), and may include, for example, instantaneous decoding refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In SVC, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a picture order count (POC) may be used to keep track of the relative order in which the decoded pictures are displayed. Some of such coding schemes may cause the POC values to be reset (e.g., set to zero or set to some value signaled in the bitstream) whenever certain types of pictures appear in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Layer Initialization Picture (LIP)

In some coding schemes, a layer initialization picture ("LIP picture") may be defined as a picture that is an IRAP picture that has a NoRaslOutputFlag flag (e.g., a flag that indicates that RASL pictures are not to be output if set to 1 and indicates that RASL pictures are to be output if set to 0) set to 1 or a picture that is contained an initial IRAP access unit, which is an IRAP access unit in which the base layer picture (e.g., a picture having a layer ID of 0 or smallest layer ID defined in the bitstream) has the NoRaslOutputFlag set to 1.

In some embodiments, an SPS can be activated at each LIP picture. For example, each IRAP picture that has a NoRaslOutputFlag flag set to 1 or each picture that is contained in an initial IRAP access unit, a new SPS, which may be different (e.g., specifying different picture resolutions, etc.) from the SPS that was previously activated. However, in a case where the LIP picture is not an IRAP picture (e.g., any picture contained in an initial IRAP access unit) and the base layer picture in the initial IRAP access unit is an IDR picture with a flag NoClrasOutputFlag flag (e.g., a flag that indicates that cross-layer random access skip pictures are not to be output if set to 1 and indicates that cross-layer random access skip pictures are to be output if set to 0) set to 0, the LIP picture should not be allowed to activate a new SPS. If a new SPS is activated at such the LIP picture in such a case, particularly when the contents of the SPS RBSP of the new SPS is different from that of the SPS that was previously active prior to the initial IRAP access unit, there could be problems in differing picture resolutions and error resilience. For example, the new SPS may update the resolution and use temporal prediction to refer to pictures of different sizes.

Bumping and Flushing of Pictures

Pictures that are decoded (e.g., so that they can be displayed or used to predict other pictures) are stored in a decoded picture buffer (DPB). The pictures that are to be output may be marked as "needed for output," and the pictures that are to be used to predict other pictures may be marked as "used for reference." Decoded pictures that are neither marked as "needed for output" nor as "used for reference" (e.g., pictures that were initially marked as "used for reference" or "needed for output" but subsequently marked as "not used for reference" or "not needed for output") may be present in the DPB until they are removed by the decoding process. In output order conformant decoders, the process of removing pictures from the DPB often immediately follows the output of pictures that are marked as "needed for output." This process of output and subsequent removal may be referred to as "bumping."

There are also situations where the decoder may remove the pictures in the DPB without output, even though these pictures may be marked as "needed for output." For ease of description herein, decoded pictures that are present in the DPB at the time of decoding an IRAP picture (regardless of whether the decoded pictures are marked as "needed for output" or "used for reference") are referred to as "lagging DPB pictures" associated with the IRAP picture or "associated lagging DPB pictures" of the IRAP picture. Some examples of such situations, in the HEVC context, are described below.

In one example, when a CRA picture with NoRaslOutputFlag equal to a value of "1" is present in the middle of a bitstream (e.g., not the first picture in the bitstream), the lagging DPB pictures associated with the CRA picture would not be output and would be removed from the DPB. Such situations are likely to occur at splice points, where two bitstreams are joined together and the first picture of the latter bitstream is a CRA picture with NoRaslOutputFlag equal to a value of "1". In another example, when an IRAP picture picA that has NoRaslOutputFlag equal to a value of "1" and that is not a CRA picture (e.g., an IDR picture) is present in the middle of a bitstream and the resolution of the picture changes at picA (e.g., with the activation of a new SPS), the associated lagging DPB pictures of picA may be removed from the DPB before they can be output, because if the associated lagging DPB pictures continue to occupy the DPB, decoding of the pictures starting from picA may become problematic, for example, due to buffer overflow. In this case, the value of no_output_of_prior_pics_flag (e.g., a flag that indicates that pictures that were previously decoded and stored in the DPB should be removed from the DPB without being output if set to 1, and indicates that pictures that were previously decoded and stored in the DPB should not be removed from the DPB without being output if set to 0) associated with picA should be set equal to a value of "1" by the encoder or splicer, or NoOutputOfPriorPicsFlag (e.g., a derived value that may be determined based on the information included in the bitstream) may be derived to be equal to a value of "1" by the decoder, to flush the lagging pictures without output out of the DPB. The splicing operation is described further below with respect to FIG. 4.

This process of removing associated lagging DPB pictures from the DPB without output may be referred to as "flushing." Even in situations not described above, an IRAP picture may specify the value of no_output_of_prior_pics_flag equal to a value of "1", so that the decoder will flush the associated DPB lagging pictures of the IRAP picture.

Bitstream Including a Splice Point

Figure 4:
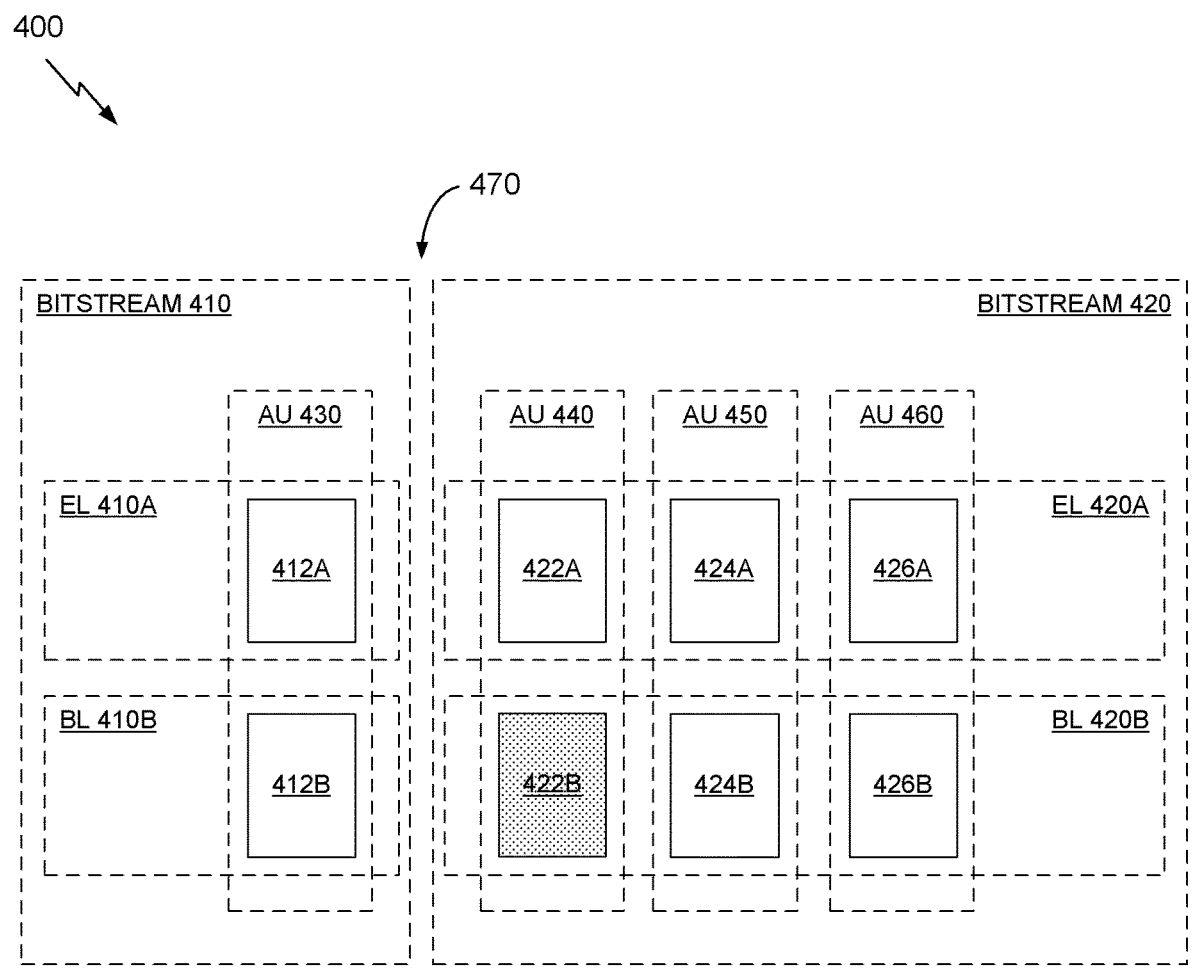
FIG. 4 is a block diagram illustrating an example configuration of pictures in different layers, according to one embodiment of the present disclosure.

With reference to FIG. 4, an example bitstream having a splice point will be described. FIG. 4 shows a multi-layer bitstream 400 created by splicing bitstreams 410 and 420. The bitstream 410 includes an enhancement layer (EL) 410A and a base layer (BL) 410B, and the bitstream 420 includes an EL 420A and a BL 420B. The EL 410A includes an EL picture 412A, and the BL 410B includes a BL picture 412B. The EL 420A includes EL pictures 422A, 424A, and 426A, and the BL 420B includes BL pictures 422B, 424B, and 426B. The multi-layer bitstream 400 further includes access units (AUs) 430-460. The AU 430 includes the EL picture 412A and the BL picture 412B, the AU 440 includes the EL picture 422A and the BL picture 422B, the AU 450 includes the EL picture 424A and the BL picture 424B, and the AU 460 includes the EL picture 426A and the BL picture 426B. In the example of FIG. 4, the BL picture 422B is an IRAP picture, and the corresponding EL picture 422A in the AU 440 is a trailing picture (e.g., a non-IRAP picture), and consequently, the AU 440 is a non-aligned IRAP AU. Also, it should be noted that the AU 440 is an access unit that immediately follows a splice point 470.

Although the example of FIG. 4 illustrates a case where two different bitstreams are joined together, in some embodiments, a splice point may be present when a portion of the bitstream is removed. For example, a bitstream may have portions A, B, and C, portion B being between portions A and C. If portion B is removed from the bitstream, the remaining portions A and C may be joined together, and the point at which they are joined together may be referred to as a splice point. More generally, a splice point as discussed in the present application may be deemed to be present when one or more signaled or derived parameters or flags have predetermined values. For example, without receiving a specific indication that a splice point exists at a particular location, a decoder may determine the value of a flag (e.g., NoClrasOutputFlag), and perform one or more techniques described in this application based on the value of the flag.

Flushing of Pictures in Multi-Layer Context

The process of flushing pictures is also relevant in multi-layer bitstreams. More specifically, it is relevant to all pictures that belong to an initial IRAP access unit, and also to IRAP pictures that are not in an initial IRAP access unit. As described above, in some existing implementations such as SHVC and MV-HEVC, an IRAP access unit may be defined as an access unit containing an IRAP picture that has nuh_layer_id equal to a value of "0" (regardless of whether other pictures in the access unit are IRAP pictures), and an initial IRAP access unit may be defined as an access unit containing an IRAP picture that has nuh_layer_id equal to a value of "0" and that has NoRaslOutputFlag equal to a value of "1" (again regardless of whether other pictures in the access unit are IRAP pictures).

With the possibility of having non-aligned IRAP pictures in access units (e.g., an access unit may contain both IRAP pictures and non-IRAP pictures) in SHVC and MV-HEVC, the situations described in the previous section in the context of HEVC can occur in different layers of an SHVC/MV-HEVC bitstream. For example, a CRA picture picA that has NoRaslOutputFlag equal to a value of "1" may be present at an enhancement layer in the middle of a bitstream (e.g., not in the first access unit of the bitstream) that starts with an initial IRAP access unit that does not have a CRA picture in the same layer as picA. Also, the resolution change of a picture could occur at IRAP pictures in an enhancement layer at an access unit where the resolution of the base layer does not change, or vice versa. Similar situations may arise for different DPB sizes.

Flushing of Pictures in SVC and MVC

Due to the single-loop coding design of SVC, only one reconstructed picture per access unit is inserted in the DPB, except for cases when the so-called medium-granular scalability (MGS) is in use (in which case there can be two decoded pictures from the so-called key-picture access units that are stored in the DPB). However, in each access unit only the decoded picture of the highest layer may be output. Operations for managing the DPB, including the flushing of pictures, therefore, only concern pictures in the highest layer, mainly because a decoded picture of a base layer is not required to be present in the DPB in order to predict the enhancement layer.

In MVC, more than one view may be target output view, and decoded view components need to be maintained to predict view components in other layer, even if they are not needed to predict view components in the same layer. Therefore, view components from more than one view may be present in the DPB. The flag no_output_of_prior_pics_flag is signaled for each IDR view component (e.g., an IDR view component of a non-base view is signaled with non_idr_flag equal to a value of "0"), and the flushing of view components is layer-specific (or view-specific). In MVC, for simplicity, the IDR view components in an access unit in MVC are aligned. For example, if one view component in an access unit is an IDR view component, all the view components in that access unit are also IDR view components. Hence, flushing operation is also performed across all views in the bitstream, even though the operation may be view/layer-specific.

Flushing of Pictures in SHVC and MV-HEVC

When flushing occurs under the current design in SHVC and MV-HEVC, all the pictures in the DPB are removed without being output (e.g., displayed). It is not possible that pictures of only one layer in the bitstream (except in the trivial case when only the base layer is present in the bitstream) are flushed, therefore the flushing is not layer-specific.

Output Timing Conformance

In some implementations (e.g., SHVC, MV-HEVC, etc.), such as SHVC Working Draft (WD) 5 and MV-HEVC Working Draft 7, the output and removal of pictures from the DPB for output timing conformance are performed as described below.

TABLE 1

Output Timing Conformance in SHVC WD 5 and MV-HEVC WD 7
C.3.2 Removal of pictures from the DPB When the current picture is not picture 0 in the current layer, the removal of pictures in the current layer, with nuh_layer_id equal to currLayerId, from the DPB before decoding of the current picture, i.e. picture n, but after parsing the slice header of the first slice of the current picture, happens instantaneously at the CPB removal time of the first decoding unit of the current picture and proceeds as follows:
    The decoding process for RPS as specified in subclause 8.3.1 is invoked.
    When the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:
    1. The variable NoOutputOfPriorPicsFlag is derived for the decoder under test as follows:
        If the current picture is a CRA picture with NoRaslOutputFlag equal to 1, NoOutputOfPriorPicsFlag is set equal to 1 (regardless of the value of no_output_of_prior_pics_flag).
        Otherwise, if the current picture is an IRAP picture with NoRaslOutputFlag equal to 1 and the value of pic_width_in_luma_samples, pic_height_in_luma_samples, chroma_format_idc, bit_depth_luma_minus8, bit_depth_chroma_minus8, or sps_max_dec_pic_buffering_minus1[ HighestTid ] derived from the active SPS for the current layer is different from the value of pic_width_in_luma_samples, pic_height_in_luma_samples, chroma_format_idc, bit_depth_luma_minus8, bit_depth_chroma_minus8, or sps_max_dec_pic_buffering_minus1[ HighestTid ], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.
        NOTE - Although setting NoOutputOfPriorPicsFlag equal to no_output_of_prior_pics_flag is preferred under these conditions, the decoder under test is allowed to set NoOutputOfPriorPicsFlag to 1 in this case.
        Otherwise, if the current picture is an IRAP picture with NoRaslOutputFlag equal to 1, NoOutputOfPriorPicsFlag is set equal to no_output_of_prior_pics_flag.
        Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.
    2. The value of NoOutputOfPriorPicsFlag derived for the decoder under test is applied for the HRD, such that when the value of NoOutputOfPriorPicsFlag is equal to 1, all picture storage buffers that contain pictures with nuh_layer_id equal to currLayerId in the sub-DPB are emptied without output of the pictures they contain, and the DPB fullness is decremented by the number of picture storage buffers that were emptied.
When both of the following conditions are true for any pictures k in the DPB, all such pictures k in the DPB are removed from the DPB:
    picture k is marked as "unused for reference"
    picture k has PicOutputFlag equal to 0 or its DPB output time is less than or equal to the CPB removal time of the first decoding unit (denoted as decoding unit m) of the current picture n; i.e. DpbOutputTime[ k ] is less than or equal to CpbRemovalTime( m )
For each picture that is removed from the DPB, the DPB fullness is decremented by one.

Output Order Conformance

In some implementations (e.g., SHVC, MV-HEVC, etc.), the output and removal of pictures from the DPB for output order conformance are performed as described below.

TABLE 2

Output Order Conformance in SHVC WD 5 and MV-HEVC WD 7
C.5.2.2. Output and removal of pictures from the DPB When the current picture is not picture 0 in the current layer, the output and removal of pictures in the current layer, with nuh_layer_id equal to currLayerId, from the DPB before the decoding of the current picture , i.e. picture n, but after parsing the slice header of the first slice of the current picture and before the invocation of the decoding process for picture order count, happens instantaneously when the first decoding unit of the current picture is removed from the CPB and proceeds as follows:
    When the current picture is a POC resetting picture, all pictures in the DPB that do not belong to the current access unit and that are marked as "needed for output" are output, starting with pictures with the smallest value of PicOrderCntVal of all pictures excluding those in the current access unit in the DPB, in ascending order of the PicOrderCntVal values, and pictures with the same value of PicOrderCntVal are output in ascending order of the nuh_layer_id values. When a picture is output, it TABLE 2-continued Output Order Conformance in SHVC WD 5 and MV-HEVC WD 7
C.5.2.2. Output and removal of pictures from the DPB is cropped using the conformance cropping window specified in the active SPS for the picture, the
cropped picture is output, and the picture is marked as "not needed for output".
The decoding processes for picture order count and RPS are invoked. When decoding a CVS
conforming to one or more of the profiles specified in Annex A using the decoding process specified
in clauses 2 through 10, the decoding processes for picture order count and RPS that are invoked are
as specified in subclauses 8.3.1and 8.3.2, respectively. When decoding a CVS conforming to one or
more of the profiles specified in Annex G or H using the decoding process specified in Annex F, and
Annex G or H, the decoding processes for picture order count and RPS that are invoked are as
specified in subclauses F.8.3.1 and F.8.3.2, respectively.
If the current picture is an IRAP picture with NoRaslOutputFlag equal to 1, or the base layer picture
in the current access unit is an IRAP picture with NoRaslOutputFlag equal to 1 and
NoClrasOutputFlag is equal to 1, the following ordered steps are applied:
1. The variable NoOutputOfPriorPicsFlag is derived for the decoder under test as follows:
    If the current picture is a CRA picture with NoRaslOutputFlag equal to 1,
    NoOutputOfPriorPicsFlag is set equal to 1 (regardless of the value of
    no_output_of_prior_pics_flag).
    Otherwise, if the current picture is an IRAP picture with NoRaslOutputFlag equal to 1 and
    the value of pic_width_in_luma_samples, pic_height_in_luma_samples,
    chroma_format_idc, bit_depth_luma_minus8, bit_depth_chroma_minus8, or
    sps_max_dec_pic_buffering_minus1[ HighestTid ] derived from the active SPS for the
    current layer is different from the value of pic_width_in_luma_samples,
    pic_height_in_luma_samples, chroma_format_idc, bit_depth_luma_minus8,
    bit_depth_chroma_minus8, or sps_max_dec_pic_buffering_minus1[ HighestTid ],
    respectively, derived from the SPS that was active for the current layer when decoding the
    preceding picture in the current layer, NoOutputOfPriorPicsFlag may (but should not) be set
    to 1 by the decoder under test, regardless of the value of no_output_of_prior_pics_flag.
        NOTE - Although setting NoOutputOfPriorPicsFlag equal to no_output_of_prior_pics_flag
        is preferred under these conditions, the decoder under test is allowed to set
        NoOutputOfPriorPicsFlag to 1 in this case.
    Otherwise, if the current picture is an IRAP picture with NoRaslOutputFlag equal to 1,
    NoOutputOfPriorPicsFlag is set equal to no_output_of_prior_pics_flag.
    Otherwise (the current picture is not an IRAP picture with NoRaslOutputFlag equal to 1, the
    base layer picture in the current access unit is an IRAP picture with NoRaslOutputFlag
    equal to 1, and NoClrasOutputFlag is equal to 1), NoOutputOfPriorPicsFlag is set equal to
    1.
2. The value of NoOutputOfPriorPicsFlag derived for the decoder under test is applied for the HRD
    as follows:
    If NoOutputOfPriorPicsFlag is equal to 1, all picture storage buffers that contain pictures
    with nuh_layer_id equal to currLayerId in the sub-DPB are emptied without output of the
    pictures they contain, and the sub-DPB fullness is decremented by the number of picture
    storage buffers that were emptied.
    Otherwise (NoOutputOfPriorPicsFlag is equal to 0), all picture storage buffers containing a
    picture that is marked as "not needed for output" and "unused for reference" are emptied (without
    output), and all non-empty picture storage buffers that contain pictures with nuh_layer_id equal
    to currLayerId in the sub-DPB are output by repeatedly invoking the "bumping" process
    specified in subclause C.5.2.4 until all these pictures are marked as "not needed for output", all
    pictures that have nuh_layer_id equal to currLayerId in the sub-DPB are emptied, and the sub-
    DPB fullness is decremented by the number of picture storage buffers emptied.

Comparison of Output Timing Conformance and Output Order Conformance

As described above, the output timing conformance and output order conformance may not both result in the same flushing behavior. For example, for output timing conformance decoders, the flushing is invoked for each picture in a layer that is not the first picture of the layer in the bitstream and that has NoRaslOutputFlag equal to a value of "1". When the flushing is invoked, all decoded pictures of that layer in the DPB are flushed. On the other hand, for output order conformance decoders, the flushing is only invoked for a picture in the base layer that is not the first picture in the bitstream and that has NoRaslOutputFlag equal to a value of "1." When the flushing is invoked, all decoded pictures of all layers in the DPB are flushed.

In a bitstream having two layers, when a LIP picture in the EL that is an IRAP picture and does not belong to an IRAP AU activates a different resolution, and the resolution of the BL cannot change at this AU due to the BL picture being in an non-IRAP AU (e.g., not an IRAP picture), a layer-specific flushing of pictures may be desired. Here, only pictures from the EL, but not from the BL, are to be flushed. This feature is not available for output order conformance.

In a bitstream having two layers, in a case where an access unit includes a BL picture that is an IDR picture and an EL picture that is a non-IRAP picture, the resolution of the BL picture may be updated at the access unit, whereas the resolution of the EL picture is not updated. In such a case, flushing should be performed only for the pictures from the BL, and the EL pictures should not be flushed. This feature is not available for output order conformance.

Signaling of Flag Indicating Output of Prior Pictures

In some embodiments, the variable NoOutputOfPriorPicsFlag (e.g., a value derived by the decoder to determine, when decoding an IRAP picture, whether or not to output the pictures in the DPB before the DPB is flushed) is derived based on no_output_of_prior_pics_flag and other conditions. For example, no_output_of_prior_pics_flag may be a value that is signaled in the bitstream, whereas NoOutputOfPriorPicsFlag may be a value derived by an encoder based on the information included in the bitstream. A decoder may derive the value of NoOutputOfPriorPicsFlag based on the value of no_output_of_prior_pics_flag and other conditions, and then use the derived value of NoOutputOfPriorPicsFlag to determine whether to output pictures or not. In some embodiments, the flag NoOutputOfPriorPicsFlag may indicate whether the current access unit comprises a splice point, at which two different bitstreams are stitched together.

In some embodiments, NoClRasOutputFlag and NoRaslOutputFlag may be variables derived based on the information included in the bitstream. For example, NoRaslOutputFlag may be derived for every IRAP picture (e.g., in BL and/or EL), and NoClRasOutputFlag may be derived only for the lowest layer pictures (e.g., BL pictures). The value of each of NoClRasOutputFlag and NoRaslOutputFlag may indicate that some pictures in the bitstream may not be correctly decodable due to the unavailability of certain reference pictures. Such unavailability of reference pictures may occur at random access points. Cross-layer random access skip (CL-RAS) pictures are, in some ways, the multi-layer equivalent of RASL pictures. If a decoder starts decoding a bitstream at a random access point (e.g., an access unit having a BL IRAP picture), and the EL picture in the access unit is not an IRAP picture, then that EL picture is a CL-RAS picture. All pictures in the EL may be CL-RAS pictures (e.g., decodable, but not correctly decodable) until an IRAP picture occurs in the EL. When such an EL IRAP picture is provided in the bitstream, the EL may be said to have been initialized.

For example, in the example of FIG. 4, the EL picture 422A may be a LIP picture that is not an IRAP picture, and the BL picture 422B may be an IRAP picture that has a flag NoClRasOutputFlag associated therewith. In this example, the value of NoOutputOfPriorPicsFlag associated with the EL picture 422A may be inferred based on the value of NoClRasOutputFlag associated with the BL picture 422B. For example, if NoClRasOutputFlag is equal to a value of "1", NoOutputOfPriorPicsFlag for the EL picture 422A may also be set to a value of "1", causing the pictures in the DPB to be not output before they are removed from the DPB. On the other hand, if NoClRasOutputFlag is equal to a value of "0", NoOutputOfPriorPicsFlag for the EL picture 422A may also be set to a value of "0", causing the pictures in the DPB to be removed from the DPB after output.

Derivation of SPS Temporal ID Nesting Information and End of Sequence (EOS) NAL Unit Information for Multi-Layer Bitstreams In a multi-layer bitstream, a layer can include one or more temporal sub-layers. Each temporal sub-layer can have an identifier (ID) associated with it called temporal ID. For example, if the base layer in the multi-layer bitstream has two temporal sub-layers, the temporal ID for the first temporal sub-layer is 0, and the temporal ID for the second temporal sub-layer is 1. In general, pictures that have a higher temporal ID than the current picture are not used as reference pictures for the current picture. The flag sps_temporal_id_nesting_flag can further indicate whether a particular picture that has a temporal ID equal to or lower than the temporal ID of the current picture can be used as a reference picture when there exists another picture that has a lower temporal ID than the particular picture and that follows the particular picture in decoding order but precedes the current picture in decoding order. For instance, when sps_temporal_id_nesting_flag is enabled (e.g., is set equal to 1), if picture A has a temporal ID lower than or equal to the current picture, but picture B has a lower temporal ID than picture A and is between picture A and the current picture in decoding order (e.g., POC value between the POC value of picture A and the current picture), then picture A cannot be used as a reference picture for the current picture. On the other hand, when sps_temporal_id_nesting_flag is not enabled (e.g., is set equal to 0), if picture A has a temporal ID lower than or equal to the current picture, but picture B has a lower temporal ID than picture A and is between picture A and the current picture in decoding order (e.g., POC value between the POC value of picture A and the current picture), picture A can be used as a reference picture for the current picture.

The early versions of SHVC and MV-HEVC (e.g., Working Draft 5 of SHVC and Working Draft 7 of MV-HEVC) pose a conflict in the derivation of sps_temporal_id_nesting_flag when the syntax element is not present in the bitstream. Under certain conditions, the value of the flag cannot be determined to be either 0 or 1. In order to address these and other challenges, the techniques according to certain aspects can define how to derive the value of sps_temporal_id_nesting_flag under such conditions (e.g., set precedence in the derivation process) in order to eliminate the conflict.

In addition, in HEVC, one AU contains a picture from only one layer, and often the concept of picture and AU can be used interchangeably. In contrast, in SHVC and MV-HEVC, one AU may contain pictures from more than one layer, which can make it uncertain whether a variable or a flag should be associated with a particular layer (e.g., the base layer) or should apply to the whole AU. One example of such a variable is HandleCraAsBlaFlag. The variable HandleCraAsBlaFlag can indicate whether to handle a CRA picture as a BLA picture. For instance, when a bitstream is randomly accessed or spliced at a CRA, the CRA would be converted to a BLA, e.g., in order to remove any RASL pictures that follow the CRA. The variable may be introduced, for example, via external means, to facilitate the process of treating a CRA as a BLA. A decoder or splicer can easily process the CRA as BLA based on the value of the variable, instead of actually converting the CRA to a BLA, which can require changing the slice header of a CRA. The early versions of SHVC and MV-HEVC make it unclear whether HandleCraAsBlaFlag is associated with only the base layer or the AU. In order to address these and other challenges, the techniques according to certain aspects can also define whether HandleCraAsBlaFlag should be associated with only the base layer or the AU.

Moreover, as explained above with respect to HandleCraAsBlaFlag, because one AU can have pictures from more than one layer in SHVC and MV-HEVC, it may be uncertain whether an EOS NAL unit should be associated with a particular layer (e.g., the base layer) or should apply to the whole AU. The EOS NAL unit can indicate the end of a coded video sequence (CVS) and is generally followed by an IRAP picture, such as an IDR picture, a BLA picture, or a CRA picture. The early versions of SHVC and MV-HEVC do not make it clear whether the EOS NAL unit is associated with only the base layer or the AU. In order to address these and other challenges, the techniques according to certain aspects can define whether the EOS NAL unit should be associated with only the base layer or the AU.

Certain details relating to derivation of SPS temporal ID nesting information and EOS NAL unit information for multi-layer bitstreams, as well as derivation of HandleCraAsBlaFlag, are explained further below. Various terms used throughout this disclosure are broad terms having their ordinary meaning. In addition, in some embodiments, certain terms relate to the following video concepts. External means may refer to any apparatus or entity that is not a part of an encoder or a decoder but interacts with the encoder or the decoder, e.g., through an application programming interface (API). In certain embodiments, external means may also be referred to as an external apparatus.

Derivation of SPS Temporal ID Nesting Information for Multi-Layer Bitstreams

In the early versions of SHVC and MV-HEVC, the semantics of sps_temporal_id_nesting_flag may be specified as follows:

TABLE 3 sps_tempral_id_nesting_flag in SHVC WD 5 and MV-HEVC WD 7 sps_temporal_id_nesting_flag, when sps_max_sub_layers_minus1 is greater than 0, specifies whether inter prediction is additionally restricted for CVSs referring to the SPS. When vps_temporal_id_nesting_flag is equal to 1, sps_temporal_id_nesting_flag shall be equal to 1. When sps_max_sub_layers_minus1 is equal to 0, sps_temporal_id_nesting_flag shall be equal to 1. When not present, sps_temporal_id_nesting_flag is inferred to be equal to vps_temporal_id_nesting_flag.

In the early versions of SHVC and MV-HEVC, when sps_temporal_id_nesting_flag is equal to 1, the following may apply:

Let tIdA be the value of TemporalId of the current picture picA.

Any picture picB with TemporalId equal to tIdB that is less than or equal to tIdA shall not be included in RefPicSetStCurrBefore, RefPicSetStCurrAfter, or RefPicSetLtCurr of picA when there exists a picture picC that has TemporalId less than tIdB, follows picB in decoding order, and precedes picA in decoding order.

There may be issues with the inference of sps_temporal_id_nesting_flag when the syntax element is not present or indicated. Some of the conditions and/or constraints may be as follows: 1) when not present, sps_temporal_id_nesting_flag is inferred to be equal to vps_temporal_id_nesting_flag; and 2) when sps_max_sub_layers_minus1 is equal to 0, sps_temporal_id_nesting_flag is equal to 1.

A conflict may occur when sps_temporal_id_nesting_flag is not present and the values of vps_temporal_id_nesting_flag and sps_max_sub_layers_minus1 are both equal to 0. In such cases, both of the above-mentioned conditions are not satisfied at the same time, and it may not be clear whether the value of sps_temporal_id_nesting_flag should be inferred to be equal to 0 or 1.

Example Embodiment 1

In order to address the conflict, the semantics of sps_temporal_id_nesting_flag may be modified as follows. The example embodiments in this disclosure are provided in the context of earlier versions of SHVC and MV-HEVC (e.g., SHVC WD 5 and MV-HEVC WD 7). Additions to the earlier versions of SHVC and MV-HEVC are indicated in italics, and deletions from the earlier versions of SHVC and MV-HEVC are indicated in strikethrough.

According to some embodiments, the syntax elements and variables used in the inference of sps_temporal_id_nesting_flag may refer to the following:

The syntax element or variable vps_temporal_id_nesting_flag can be similar to sps_temporal_id_nesting_flag and is associated with a VPS.

For example, vps_temporal_id_nesting_flag can indicate at the VPS level whether a particular picture that has a temporal ID equal to or lower than the temporal ID of the current picture can be used as a reference picture when there exists another picture that has a lower temporal ID than the particular picture and that follows the particular picture in decoding order but precedes the current picture in decoding order.

vps_temporal_id_nesting_flag may have less precedence than sps_temporal_id_nesting_flag. If both vps_temporal_id_nesting_flag and sps_temporal_id_nesting_flag are present for a particular layer, the value of sps_temporal_id_nesting_flag for that layer is used, not the value of vps_temporal_id_nesting_flag.

The syntax element or variable sps_max_sub_layers_minus1 refers to the maximum number of temporal sub-layers in a particular layer minus1.

For example, if there is only one temporal sub-layer in a layer, the maximum number of temporal sub-layers in the layer is 1, and therefore, the value of sps_max_sub_layers_minus1 is 0. In another example, if there are two temporal sub-layers in a layer, the maximum number of temporal sub-layers in the layer is 2, and therefore, the value of sps_max_sub_layers_minus1 is 1.

In this embodiment, when the syntax element sps_temporal_id_nesting_flag is not present in the bitstream, the value of sps_temporal_id_nesting_flag can be inferred by checking the value of sps_max_sub_layers_minus1. If sps_max_sub_layers_minus1 is greater than 0, the value of sps_temporal_id_nesting_flag is set equal to the value of vps_temporal_id_nesting_flag. If sps_max_sub_layers_minus1 is less than or equal to 0, the value of sps_temporal_id_nesting_flag is set equal to 1. Example Embodiment 1 sets precedence for which of the conditions and/or constraints 1) and 2) above should apply first. Example Embodiment 1 can first define how to infer the value of sps_temporal_id_nesting_flag when sps_max_sub_layers_minus1 is greater than 0 since a layer has more than one temporal sub-layer in this case. When sps_max_sub_layers_minus1 is less than or equal to 0, a layer has more than one temporal sub-layer so the value of sps_temporal_id_nesting_flag may not be as important.

In this manner, the techniques can eliminate the conflict in derivation of sps_temporal_id_nesting_flag when sps_temporal_id_nesting_flag is not present in the bitstream and the

TABLE 4

Example Embodiment 1 sps_temporal_id_nesting_flag, when sps_max_sub_layers_minus1 is greater than 0, specifies whether inter prediction is additionally restricted for CVSs referring to the SPS. When vps_temporal_id_nesting_flag is equal to 1, sps_temporal_id_nesting_flag shall be equal to 1. When sps_max_sub_layers_minus1 is equal to 0, sps_temporal_id_nesting_flag shall be equal to 1. When not present, *the value of* sps_temporal_id_nesting_flag is inferred *as follows:* ~~to be equal to vps_temporal_id_nesting_flag.~~

*If sps_max_sub_layers_minus1 is greater than 0, the value of sps_temporal_id_nesting_flag is inferred to be equal to vps_temporal_id_nesting_flag.*

*Otherwise, the value of sps_temporal_id_nesting_flag is inferred to be equal to 1.* values of vps_temporal_id_nesting_flag and sps_max_sub_layers_minus1 are both equal to 0.

Figure 5:
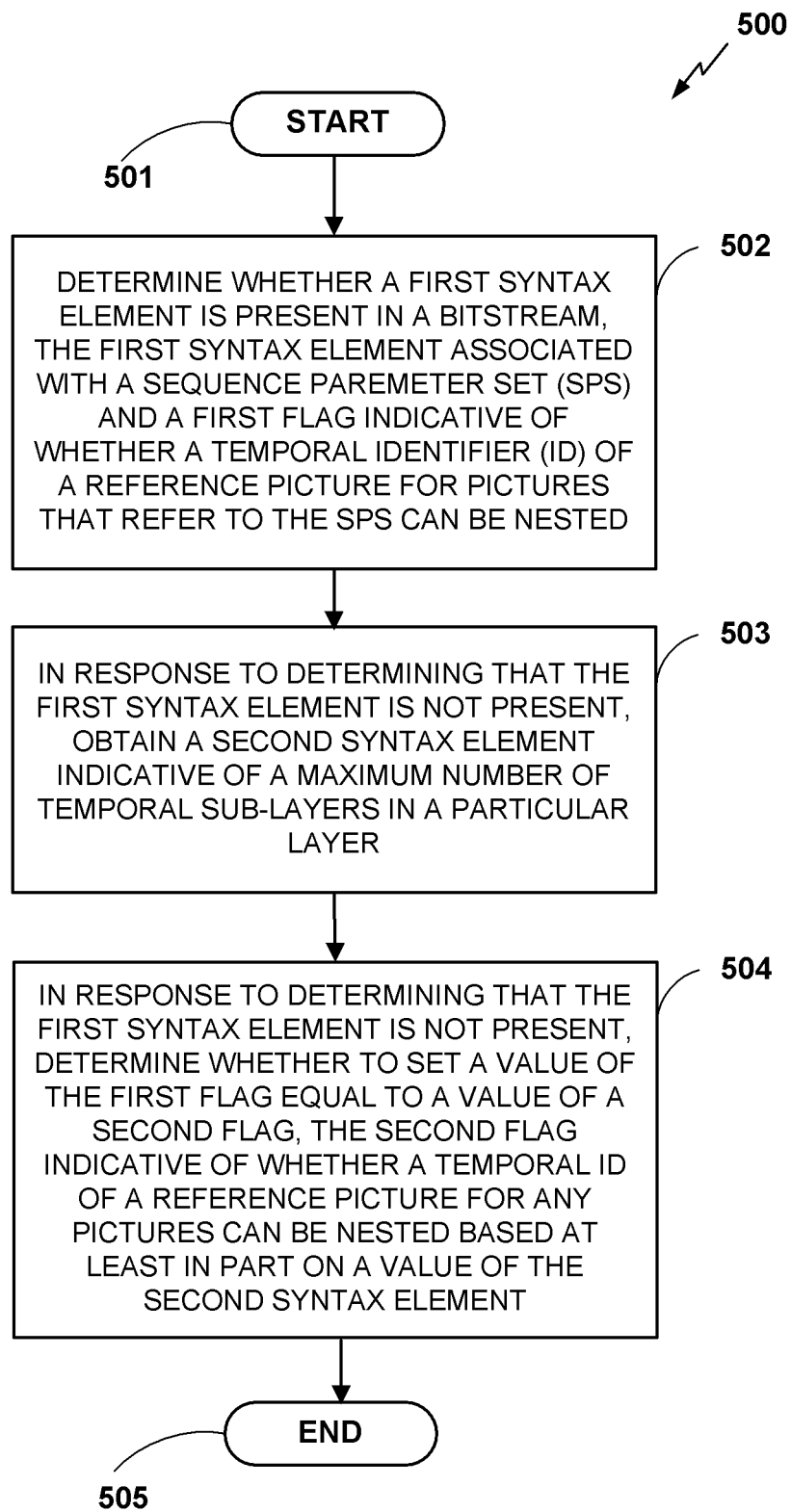
FIG. 5 is a flowchart illustrating a method of coding video information, according to one embodiment of the present disclosure.

Method of Derivation of SPS Temporal ID Nesting Information for Multi-Layer Bitstreams FIG. 5 is a flowchart illustrating a method of coding video information, according to one embodiment of the present disclosure. The method relates to derivation of SPS temporal ID nesting information for multi-layer bitstreams. The process 500 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 500 are described with respect to the decoder 33 in FIG. 3B, but the process 500 may be performed by other components, such as an encoder, as mentioned above. The layer 1 video decoder 30B of the decoder 33 and/or the layer 0 decoder 30A of the decoder 33 may perform the process 500, depending on the embodiment. All embodiments described with respect to FIG. 5 may be implemented separately, or in combination with one another. Certain details relating to the process 500 are explained above, e.g., with respect to FIG. 4.

The process 500 starts at block 501. The decoder 33 can include a memory for storing video information associated with a plurality of layers.

At block 502, the decoder 33 determines whether a first syntax element is present in a bitstream. The first syntax element can be associated with a SPS and a first flag indicative of whether the temporal ID of a reference picture for pictures that refer to the SPS can be nested. In one embodiment, the first flag indicates whether a current picture in a current AU referring to the SPS can use a first picture as a reference picture wherein the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order. In some embodiments, the first flag includes sps_temporal_id_nesting_flag. The first picture may not be used as a reference picture when the value of the first flag is set equal to 1. The first syntax element can include sps_temporal_id_nesting_flag.

At block 503, if the first syntax element is not present in the bitstream, the decoder 33 obtains a second syntax element indicating a maximum number of temporal sub-layers in a particular layer of the plurality of layers. The second syntax element can include sps_max_sub_layers_minus1.

At block 504, if the first syntax element is not present in the bitstream, the decoder 33 determines whether to set the value of the first flag equal to the value of a second flag, the second flag indicative of whether the temporal ID of a reference picture for any pictures can be nested based at least in part on the value of the second syntax element. In one embodiment, the second flag indicates whether a current picture in a current AU can use a third picture as a reference picture wherein the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order. In some embodiments, the second flag includes vps_temporal_id_nesting_flag.

The decoder 33 may set the value of the first flag equal to the value of the second flag, in response to the value of the second syntax element being greater than 0, the second flag associated with a VPS in the bitstream. The decoder 33 may set the value of the first flag equal to 1, in response to the value of the second syntax element being less than or equal to 0.

The process 500 ends at block 505. Blocks may be added and/or omitted in the process 500, depending on the embodiment, and blocks of the process 500 may be performed in different orders, depending on the embodiment. Certain details relating to the process 500 are described in connection with FIG. 5A below.

Any features and/or embodiments described with respect to derivation of SPS temporal ID nesting information for multi-layer bitstreams in this disclosure may be implemented separately or in any combination thereof. For example, any features and/or embodiments described in connection with FIGS. 1-4 and other parts of the disclosure may be implemented in any combination with any features and/or embodiments described in connection with FIG. 5, and vice versa.

Figure 5A:
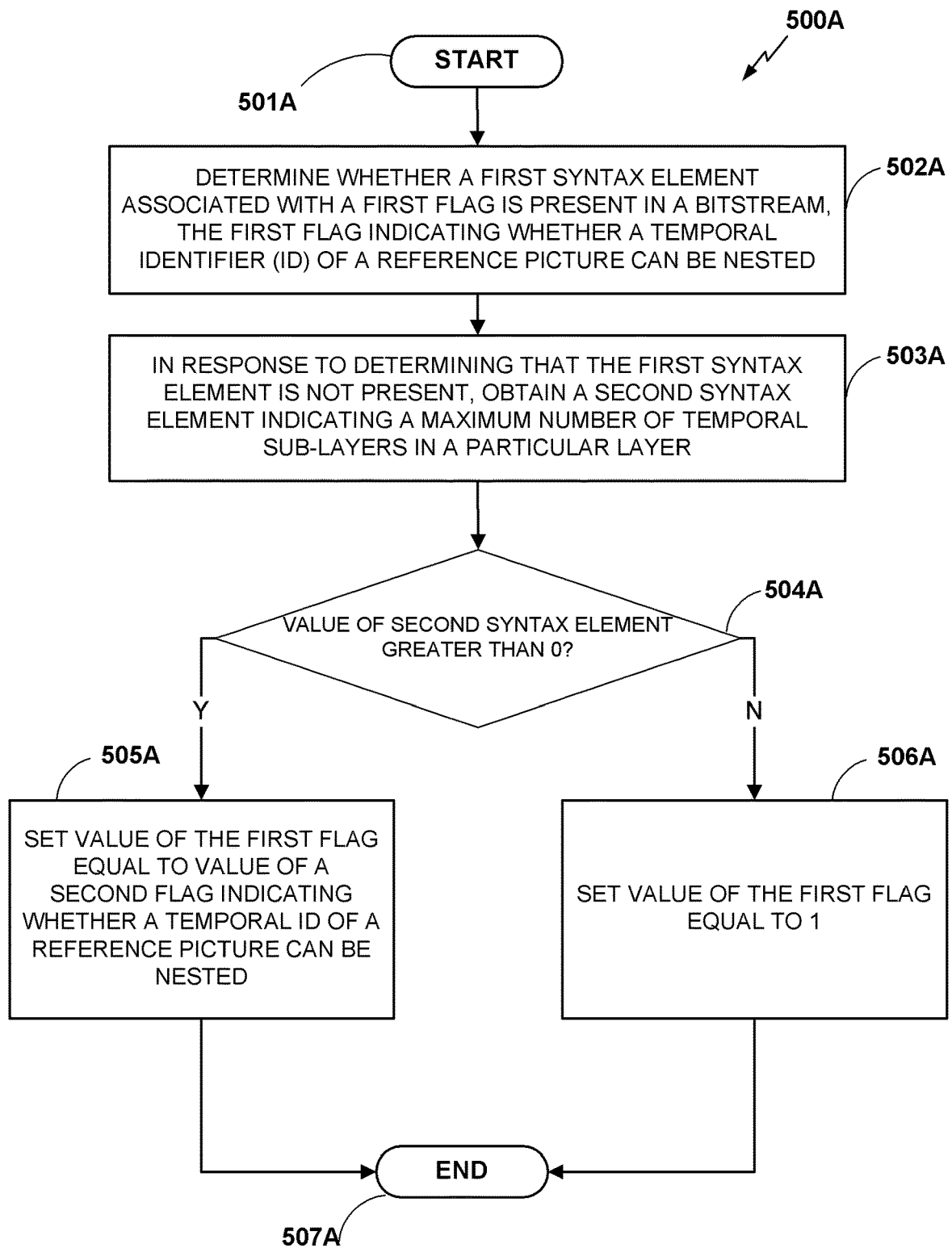
FIG. 5A is a flowchart illustrating a method of coding video information, according to one embodiment of the present disclosure.

FIG. 5A is a flowchart illustrating a method of coding video information, according to one embodiment of the present disclosure. The method relates to derivation of SPS temporal ID nesting information for multi-layer bitstreams. The process 500A may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 500A are described with respect to the decoder 33 in FIG. 3B, but the process 500A may be performed by other components, such as an encoder, as mentioned above. The layer 1 video decoder 30B of the decoder 33 and/or the layer 0 decoder 30A of the decoder 33 may perform the process 500A, depending on the embodiment. All embodiments described with respect to FIG. 5A may be implemented separately, or in combination with one another. Certain details relating to the process 500A are explained above, e.g., with respect to FIGS. 4 and 5.

The process 500A starts at block 501A. The decoder 33 can include a memory for storing video information associated with a plurality of layers.

At block 502A, the decoder 33 determines whether a first syntax element associated with a first flag is present in a bitstream. The first flag can be indicative of whether the temporal ID of a reference picture can be nested and is associated with a SPS in the bitstream. The first flag may indicate whether a current picture in a current AU can use a first picture as a reference picture where the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order. The first picture may not be used as a reference picture when the value of the first flag is set equal to 1. In one embodiment, the first syntax element is the first syntax element is sps_temporal_id_nesting_flag. In one embodiment, the first flag is sps_temporal_id_nesting_flag.

At block 503A, if the first syntax element is not present in the bitstream, the decoder 33 obtains a second syntax element indicating a maximum number of temporal sub-layers in a particular layer of the plurality of layers. In one embodiment, the second syntax element is sps_max_sub_layers_minus1.

At block 504A, if the value of the second syntax element is greater than 0, the decoder 33 sets the value of the first flag equal to the value of a second flag indicating whether a temporal ID of a reference picture can be nested, where the second flag is associated with a VPS in the bistream, at block 505A. The second flag may be indicative of whether a current picture in a current AU can use a third picture as a reference picture where the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order. The third picture and the fourth picture may refer to the same picture as the first picture and the second picture above, respectively. The first and second flags can indicate whether a particular picture that has the same or lower temporal ID than the current picture can be used as a reference picture when there exists another picture that has a lower temporal ID than the particular picture and follows the particular picture but precedes the current picture in decoding order. In one embodiment, the second flag is vps_temporal_id_nesting_flag.

At block 504A, if the value of the second syntax element is less than or equal to 0, the decoder 33 sets the value of the first flag equal to 1, at block 506A.

The process 500A ends at block 507A. Blocks may be added and/or omitted in the process 500A, depending on the embodiment, and blocks of the process 500A may be performed in different orders, depending on the embodiment.

Any features and/or embodiments described with respect to derivation of SPS temporal ID nesting information for multi-layer bitstreams in this disclosure may be implemented separately or in any combination thereof. For example, any features and/or embodiments described in connection with FIGS. 1-5 and other parts of the disclosure may be implemented in any combination with any features and/or embodiments described in connection with FIG. 5A, and vice versa.

End of Sequence NAL Unit Information for Multi-Layer Bitstreams

Given that SHVC and MV-HEVC may contain pictures of one or more layers, an access unit may contain pictures that are from different layers but have the same POC value. Therefore, it may be not clear whether an end of sequence NAL unit applies to a certain layer or applies to several or all of the layers. An EOS NAL unit can indicate the end of a sequence of pictures or access units. For example, the picture or access unit after an EOS belongs to another sequence. In multi-layer bitstreams (e.g., SHVC or MV-HEVC), since an access unit may contain more than one picture, it is not clear whether the scope of an end of sequence NAL unit is associated with a picture or an access unit. Accordingly, the techniques according to certain aspects can modify the earlier versions of SHVC and MV-HEVC in order to clarify whether the EOS NAL unit applies to a particular layer, or some or all of the layers.

Example Embodiment 2

The example embodiments in this disclosure are provided in the context of earlier versions of SHVC and MV-HEVC (e.g., SHVC WD 5 and MV-HEVC WD 7). The instructions for modifying the earlier versions of SHVC and MV-HEVC are indicated in italics, and deletions from the earlier versions of SHVC and MV-HEVC are indicated in strikethrough.

TABLE 5

Example Embodiment 2

Subclause F.7.4.2.2
*Apply the following addition:*
    *When nal_unit_type is equal to EOS_NUT, the value of nuh_layer_id shall be equal to 0. Decoders shall ignore (i.e. remove from the bitstream and discard) all NAL units with a value of nal_unit type equal to EOS_NUT and a value of nuh_layer_id not equal to 0.*
    Subclause F.7.4.2.4.3:
*Apply the following modification:*
*Replace*
    It is a requirement of bitstream conformance that, when present, the next access unit after an access unit that contains an end of sequence NAL unit or an end of bitstream NAL unit shall be an IRAP access unit, which may be an IDR access unit, a BLA access unit, or a CRA access unit.
*with*
    It is a requirement of bitstream conformance that, when present, the next access unit after an access unit that contains an end of sequence NAL unit or an end of bitstream NAL unit shall be an IRAP access unit, ~~which may be an IDR access unit, a BLA access unit, or a CRA access unit.~~
Subclause F.7.4.3.6:
*Apply the following addition:*
*There is at most one end of sequence NAL unit present in an access unit.*
Subclause F.7.4.3.7:
*Apply the following addition:*
*There is at most one end of bitstream NAL unit present in an access unit.*

In this embodiment, there is one EOS NAL unit in an AU that applies to all layers in the AU. For example, the EOS NAL unit that is present in an AU has a layer ID equal to 0. If the EOS NAL unit has a layer ID greater than 0, the decoder can ignore the EOS NAL unit. A NAL unit may have various types, and the type EOS_NUT may indicate that the NAL unit contains an EOS. According to certain aspects, a NAL unit that is of the type of EOS_NUT may be referred to as the EOS NAL unit.

Example Embodiment 2 clarifies that the EOS NAL unit applies to all layers and thereby eliminates the ambiguity in processing EOS NAL units in multi-layer bitstreams.

Example Embodiment 3

The example embodiments in this disclosure are provided in the context of earlier versions of SHVC and MV-HEVC (e.g., SHVC WD 5 and MV-HEVC WD 7). The instructions for modifying the earlier versions of SHVC and MV-HEVC are indicated in italics. Additions to the earlier versions of SHVC and MV-HEVC are indicated in italics and underline, and deletions from the earlier versions of SHVC and MV-HEVC are indicated in strikethrough.

TABLE 6

Example Embodiment 3

Subclause 8.1:
When the current picture is an IRAP picture, the following applies:
 If the current picture with a particular value of nuh_layer_id is an IDR picture, a BLA picture, the
 first picture with that particular value of nuh_layer_id in the bitstream in decoding order, or the first
 picture with that particular value of nuh_layer_id that follows an end of sequence NAL unit *with that*
 *particular* value of nuh_layer_id in decoding order, the variable NoRaslOutputFlag is set equal to 1.
Subclause F.7.4.2.4.3:
*Add the following modification:*
*Replace*
 It is a requirement of bitstream conformance that, when present, the next access unit after an access
 unit that contains an end of sequence NAL unit or an end of bitstream NAL unit shall be an IRAP
 access unit, which may be an IDR access unit, a BLA access unit, or a CRA access unit.
*with*
 It is a requirement of bitstream conformance that, when present, the next access unit after an access
 unit that contains an end of bitstream NAL unit shall be an IRAP access unit.
 It is a requirement of bitstream conformance that, when present, the next picture with a particular
 value of nuh_layer_id after an EOS NAL unit with that particular value of nuh_layer_id shall be an
 IRAP picture, which may be an IDR picture, a BLA picture, or a CRA picture.
Subclause F.7.4.2.4.4:
*Apply the following modification:*
*Replace*
 When an end of sequence NAL unit is present, it shall be the last NAL unit in the access unit other
 than an end of bitstream NAL unit (when present).
*with*
 When an end of sequence NAL unit with a particular value of nuh_layer_id is present, it shall follow
 all the VCL NAL units with nuh_layer_id less than or equal to that particular value of nuh_layer_id
 in the access unit, and precede the end of bitstream NAL unit, when present, in the access unit.

In this embodiment, an EOS NAL unit in a particular layer is only applicable to that layer. For example, each layer can have its own EOS NAL unit, and an AU can include more than one EOS NAL unit. A picture following an EOS NAL unit of a particular layer should be an IRAP picture, which can be an IDR picture, a BLA picture, or a CRA picture. When an EOS NAL unit exists for a particular layer, the EOS NAL unit can follow the Video Coding Layer (VCL) NAL units with the same ID as or a lower layer ID than the particular layer and precede the end of bitstream (EOB) NAL unit, when it is present, in the AU.

In this manner, Example Embodiment 3 clarifies that the EOS NAL unit in a particular layer applies only to the particular layer and thereby eliminates the ambiguity in processing EOS NAL units in multi-layer bitstreams.

Method of Derivation of EOS NAL Unit Information for Multi-Layer Bitstreams

Figure 6:
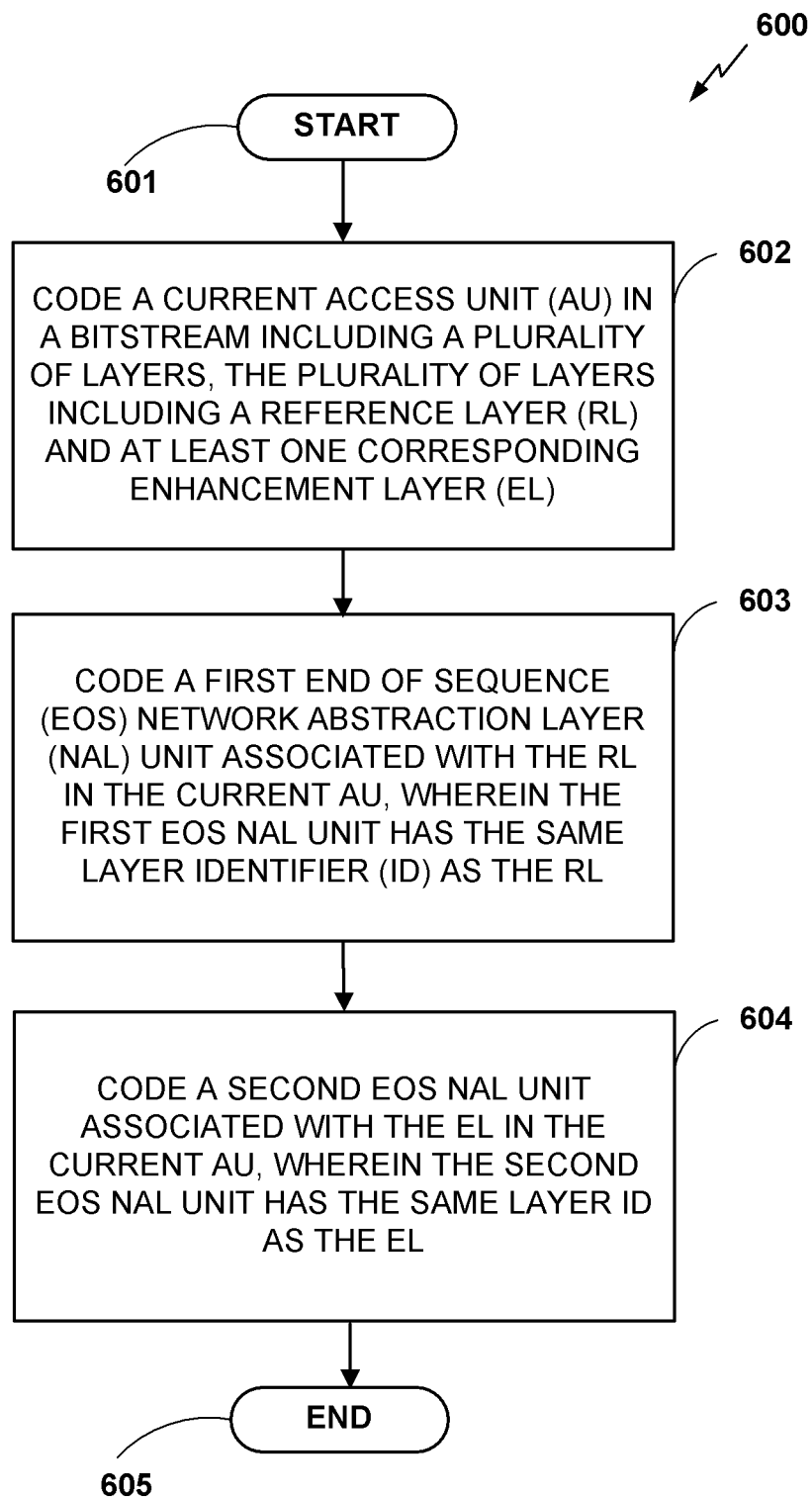
FIG. 6 is a flowchart illustrating a method of coding video information, according to one embodiment of the present disclosure.

FIG. 6 is a flowchart illustrating a method of coding video information, according to one embodiment of the present disclosure. The method relates to derivation of EOS NAL unit information for multi-layer bitstreams. The process 600 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 600 are described with respect to the decoder 33 in FIG. 3B, but the process 600 may be performed by other components, such as an encoder, as mentioned above. The layer 1 video decoder 30B of the decoder 33 and/or the layer 0 decoder 30A of the decoder 33 may perform the process 600, depending on the embodiment. All embodiments described with respect to FIG. 6 may be implemented separately, or in combination with one another. Certain details relating to the process 600 are explained above, e.g., with respect to FIGS. 4 and 5.

The process 600 starts at block 601. The decoder 33 can include a memory for storing video information associated with one or more layers.

At block 602, the decoder 33 codes a current AU in a bitstream including a plurality of layers, the plurality of layers including a reference layer and at least one corresponding enhancement layer.

At block 603, the decoder 33 codes a first EOS NAL unit associated with the reference layer in the current AU, the first EOS NAL unit having the same layer ID as the reference layer. A picture that is in an AU subsequent to the current AU and has the same layer ID as the first EOS NAL unit may be an IRAP picture selected from one or more of: an IDR picture, a BLA picture, or a CRA picture. In certain embodiments, an IRAP picture in an AU subsequent to the current AU, having the same layer ID as the first EOS NAL unit has a value of NoRaslOutputFlag equal to 1. In some embodiments, the first EOS NAL unit is subsequent to one or more VCL units in the current AU that have the same layer ID or a lower layer ID than the reference layer, and the first EOS NAL unit precedes any end of bitstream NAL unit in the current AU.

At block 604, the decoder 33 codes a second EOS NAL unit associated with the enhancement layer in the current AU, the second EOS NAL unit having the same layer ID as the enhancement layer. A picture that is in an AU subsequent to the current AU and has the same layer ID as the second EOS NAL unit may be an IRAP picture selected from one or more of: an IDR picture, a BLA picture, or a CRA picture. In certain embodiment, an IRAP picture in an AU subsequent to the current AU, having the same layer ID as the second EOS NAL unit has a value of NoRaslOutputFlag equal to 1. In some embodiments, the second EOS NAL unit is subsequent to one or more VCL units in the current AU that have the same layer ID or a lower layer ID than the enhancement layer, and the second EOS NAL unit precedes any end of bitstream NAL unit in the current AU.

The process 600 ends at block 605. Blocks may be added and/or omitted in the process 600, depending on the embodiment, and blocks of the process 600 may be performed in different orders, depending on the embodiment.

Any features and/or embodiments described with respect to derivation of EOS NAL unit information for multi-layer bitstreams in this disclosure may be implemented separately or in any combination thereof. For example, any features and/or embodiments described in connection with FIGS. 1-5 and other parts of the disclosure may be implemented in any combination with any features and/or embodiments described in connection with FIG. 6, and vice versa.

Handling CRA as BLA for Multi-Layer Bitstreams

If one AU contains pictures from more than one layer as in SHVC and MV-HEVC, it can be uncertain whether a variable or a flag associated with a particular layer (e.g., the base layer), such as the variable HandleCraAsBlaFlag, should apply to the whole AU or only the particular layer with which it is associated. With existing approaches to SHVC/MV-HEVC, HandleCraAsBlaFlag may be associated with each CRA picture. The variable may be introduced as an external means to ease random access or splicing where the system cannot change a CRA picture into a BLA picture. In multi-layer context, random access and splicing may be done at an IRAP picture at the base layer (e.g., an IRAP access unit). Thus, the value of HandleCraAsBlaFlag for a CRA picture in the base layer or in any other layer should be the same. For example, when random access happens at an IRAP access unit with a CRA picture in the base layer, and one or more (or even all) enhancement layer pictures in the same access unit are also CRA pictures, it may be desirable that they have the same value of HandleCraAsBlaFlag, such that the decoder would treat or handle them in the same manner. Consequently, the variable HandleCraAsBlaFlag can be simplified to be associated with an access unit, rather than being associated with a picture.

Example Embodiment 4

The example embodiments in this disclosure are provided in the context of earlier versions of SHVC and MV-HEVC (e.g., SHVC WD 5 and MV-HEVC WD 7). Additions to the earlier versions of SHVC and MV-HEVC are indicated in italics, and deletions from the earlier versions of SHVC and MV-HEVC are indicated in strikethrough.

TABLE 7

Example Embodiment 4

When the current access *unit* ~~picture~~ *unit contains one or more CRA* ~~is an IRAP~~ pictures, the variable HandleCraAsBlaFlag *for all CRA pictures in the access unit* isderived as specified in the following:
    If some external means not specified in this Specification is available to set the variable HandleCraAsBlaFlag to a value ~~for the current picture,~~ the variable HandleCraAsBlaFlag is set equal to the value provided by the external means.
    Otherwise, the variable HandleCraAsBlaFlag is set equal to 0.

In this embodiment, when an AU contains one or more CRA pictures, the variable HandleCraAsBlaFlag is derived to be the same for all CRA pictures in that AU. If external means can provide the value of HandleCraAsBlaFlag, the value provided by the external means is used to set the value of HandleCraAsBlaFlag. If not, HandleCraAsBlaFlag is set equal to 0.

Associating HandleCraAsBlaFlag with each CRA picture can potentially lead to having different values for HandleCraAsBlaFlag for the different CRA pictures. Accordingly, the techniques can simplify the inference of the value of HandleCraAsBlaFlag by making sure the value of HandleCraAsBlaFlag for all CRA pictures in an AU is the same.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the disclosure have been described. These and other embodiments are within the scope of the following claims.

What is claimed is:

1. An apparatus for coding video information, comprising:
a memory for storing video information associated with a plurality of layers; and
a hardware processor operationally coupled to the memory and configured to:
determine whether a first syntax element is present in a bitstream of the video information, the first syntax element associated with a sequence parameter set (SPS) and a first flag indicative of whether a temporal identifier (ID) of a reference picture for pictures that refer to the SPS can be nested; and
in response to determining that the first syntax element is not present in the bitstream:
obtain a second syntax element indicative of a maximum number of temporal sub-layers in a layer of the plurality of layers,
determine that a value of the second syntax element is less than or equal to 0,
determine that a value of a second flag associated with a video parameter set (VPS) in the bitstream is equal to 0, and
in response to the determination that the value of the second syntax element is less than or equal to 0, set the value of the first flag equal to 1.

2. The apparatus of claim 1, wherein the first flag indicates whether a current picture in a current access unit (AU) referring to the SPS can use a first picture as a reference picture wherein the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order.

3. The apparatus of claim 1, wherein the first flag comprises sps_temporalidnesting flag.

4. The apparatus of claim 1, wherein the first picture is not used as a reference picture when the value of the first flag is equal to 1.

5. The apparatus of claim 1, wherein the second flag indicates whether a current picture in a current AU can use a third picture as a reference picture wherein the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order.

6. The apparatus of claim 5, wherein the second flag comprises vps_temporal_id_nesting_flag.

7. The apparatus of claim 1, wherein the first syntax element comprises sps_temporal_id_nesting_flag and the second syntax element comprises sps_max_sub_layers_minus1.

8. A method of coding video information, comprising:
storing video information associated with a plurality of layers;
determining whether a first syntax element is present in a bitstream of the video information, the first syntax element associated with a sequence parameter set (SPS) and a first flag indicative of whether a temporal identifier (ID) of a reference picture for pictures that refer to the SPS can be nested; and
in response to determining that the first syntax element is not present in the bitstream:
obtaining a second syntax element indicative of a maximum number of temporal sub-layers in a layer of the plurality of layers,
determining that a value of the second syntax element is less than or equal to 0,
determining that a value of a second flag associated with a video parameter set (VPS) in the bitstream is equal to 0, and
in response to the determination that the value of the second syntax element is less than or equal to 0, setting the value of the first flag equal to 1.

9. The method of claim 8, wherein the first flag indicates whether a current picture in a current access unit (AU) referring to the SPS can use a first picture as a reference picture wherein the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order.

10. The method of claim 8, wherein the first flag comprises sps_temporalidnesting flag.

11. The method of claim 8, wherein the first picture is not used as a reference picture when the value of the first flag is equal to 1.

12. The method of claim 8, wherein the second flag indicates whether a current picture in a current AU can use a third picture as a reference picture wherein the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order.

13. The method of claim 12, wherein the second flag comprises vps_temporal_id_nesting_flag.

14. The method of claim 8, wherein the first syntax element comprises sps_temporal_id_nesting_flag and the second syntax element comprises sps_max_sub_layers_minus1.

15. A non-transitory computer readable medium having stored thereon instructions that when executed on a processor comprising computer hardware cause the processor to:
store video information associated with a plurality of layers;
determine whether a first syntax element is present in a bitstream of the video information, the first syntax element associated with a sequence parameter set (SPS) and a first flag indicative of whether a temporal identifier (ID) of a reference picture for pictures that refer to the SPS can be nested; and in response to determining that the first syntax element is not present in the bitstream:
   obtain a second syntax element indicative of a maximum number of temporal sub-layers in a layer of the plurality of layers,
   determine that a value of the second syntax element is less than or equal to 0,
   determine that a value of a second flag associated with a video parameter set (VPS) in the bitstream is equal to 0, and
   in response to the determination that the value of the second syntax element is less than or equal to 0, set the value of the first flag equal to 1.

16. The computer readable medium of claim 15, wherein the first flag indicates whether a current picture in a current access unit (AU) referring to the SPS can use a first picture as a reference picture wherein the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order.

17. The computer readable medium of claim 15, wherein the second flag indicates whether a current picture in a current AU can use a third picture as a reference picture wherein the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order.

18. An apparatus for coding video information, comprising:
   means for storing video information associated with a plurality of layers;
   means for determining whether a first syntax element is present in a bitstream of the video information, the first syntax element associated with a sequence parameter set (SPS) and a first flag indicative of whether a temporal identifier (ID) of a reference picture for pictures that refer to the SPS can be nested, the determining means configured to, in response to determining that the first syntax element is not present in the bitstream:
      obtain a second syntax element indicative of a maximum number of temporal sub-layers in a layer of the plurality of layers,
      determine that a value of the second syntax element is less than or equal to 0,
      determine that a value of a second flag associated with a video parameter set (VPS) in the bitstream is equal to 0, and
      in response to the determination that the value of the second syntax element is less than or equal to 0, set the value of the first flag equal to 1.

19. The apparatus of claim 18, wherein the first flag indicates whether a current picture in a current access unit (AU) referring to the SPS can use a first picture as a reference picture wherein the first picture has a temporal ID that is lower than or equal to a temporal ID of the current picture and precedes the current picture in decoding order when a second picture has a temporal ID lower than the temporal ID of the first picture and follows the first picture but precedes the current picture in decoding order.

20. The apparatus of claim 18, wherein the second flag indicates whether a current picture in a current AU can use a third picture as a reference picture wherein the third picture has a temporal ID that is lower than or equal to a temporal ID of the current picture and precedes the current picture in decoding order when a fourth picture has a temporal ID lower than the temporal ID of the third picture and follows the third picture but precedes the current picture in decoding order.

21. The apparatus of claim 1, wherein the apparatus is a wireless communication device, further comprising:
   a receiver configured to receive the bitstream containing encoded video information associated with the plurality of layers.

22. The apparatus of claim 21, wherein the wireless communication device is a cellular telephone and the encoded video data received by the receiver is modulated according to a wireless communication standard.

23. The method of claim 8, the method being executable on a wireless communication device, wherein the device comprises:
   a memory configured to store video data;
   a processor configured to execute instructions to process the video data stored in said memory; and
   a receiver configured to receive the bitstream containing encoded video information associated with the plurality of layers.

24. The method of claim 23, wherein the wireless communication device is a cellular telephone and the encoded video data received by the receiver is modulated according to a wireless communication standard.

25. The apparatus of claim 1, wherein the first flag comprises sps_temporal_id_nesting_flag, wherein the second flag comprises vps_temporal_id_nesting_flag, and wherein the second syntax element comprises sps_max_sub_layers_minus1.

26. The method of claim 8, wherein the first flag comprises sps_temporal_id_nesting_flag, wherein the second flag comprises vps_temporal_id_nesting_flag, and wherein the second syntax element comprises sps_max_sub_layers_minus1.

27. The non-transitory computer readable medium of claim 15, wherein the first flag comprises sps_temporal_id_nesting_flag, wherein the second flag comprises vps_temporal_id_nesting_flag, and wherein the second syntax element comprises sps_max_sub_layers_minus1.

28. The apparatus of claim 18, wherein the first flag comprises sps_temporal_id_nesting_flag, wherein the second flag comprises vps_temporal_id_nesting_flag, and wherein the second syntax element comprises sps_max_sub_layers_minus1.

* * * * *